US012615684B2

(12) United States Patent
Xin et al.

(10) Patent No.: US 12,615,684 B2
(45) Date of Patent: Apr. 28, 2026

(54) COMMUNICATION METHOD AND APPARATUS

(71) Applicant: HUAWEI TECHNOLOGIES CO., LTD., Shenzhen (CN)

(72) Inventors: Tingyu Xin, Shenzhen (CN); Bingzhao Li, Beijing (CN); Lei Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 326 days.

(21) Appl. No.: 18/317,586

(22) Filed: May 15, 2023

(65) Prior Publication Data

US 2023/0284325 A1      Sep. 7, 2023

Related U.S. Application Data

(63) Continuation of application No. PCT/CN2020/130166, filed on Nov. 19, 2020.

(51) Int. Cl.
*H04W 76/20*        (2018.01)
*H04W 60/04*        (2009.01)

(52) U.S. Cl.
CPC ........... *H04W 76/20* (2018.02); *H04W 60/04* (2013.01)

(58) Field of Classification Search
None
See application file for complete search history.

(56) References Cited

U.S. PATENT DOCUMENTS

| | | | | | |
|---|---|---|---|---|---|
| 9,635,641 | B2* | 4/2017 | Zeng | ..................... | H04W 24/10 |
| 2004/0223513 | A1* | 11/2004 | Meago | .................... | H04W 4/06 |
| | | | | | 370/444 |
| 2013/0070660 | A1* | 3/2013 | Xu | ........................... | H04W 4/06 |
| | | | | | 370/312 |
| 2013/0294325 | A1* | 11/2013 | Lee | ........................ | H04W 4/06 |
| | | | | | 370/312 |

(Continued)

FOREIGN PATENT DOCUMENTS

| | | |
|---|---|---|
| CN | 101119513 A | 2/2008 |
| CN | 106993275 A | 7/2017 |

(Continued)

OTHER PUBLICATIONS

India Office Action issued in corresponding India Application No. 202337035697, dated Mar. 20, 2024, pp. 1-6.

(Continued)

*Primary Examiner* — Lonnie V Sweet
(74) *Attorney, Agent, or Firm* — HAUPTMAN HAM, LLP

(57)        ABSTRACT

A coordinated transmission control method, apparatus, and system. A primary access point and a secondary access point determine whether to perform coordinated transmission through inter-cell configuration parameter sharing and based on a dual decision condition of an interference test. An anti-interference beamforming manner is determined based on a specific cell configuration parameter, and whether to perform coordinated transmission is determined with reference to the dual decision condition of the interference test, wherein the primary and secondary access points learn an interference status in advance to prevent unnecessary retransmission resulting from interference caused during actual coordinated transmission.

12 Claims, 11 Drawing Sheets

(56) References Cited

U.S. PATENT DOCUMENTS

| | | | | |
|---|---|---|---|---|
| 2018/0115430 | A1 | 4/2018 | Seo | |
| 2018/0160342 | A1* | 6/2018 | Park | H04W 36/0033 |
| 2018/0206080 | A1* | 7/2018 | Chen | H04W 76/40 |
| 2019/0191279 | A1 | 6/2019 | Fujishiro et al. | |
| 2021/0144516 | A1* | 5/2021 | Kim | H04W 72/046 |
| 2021/0168786 | A1* | 6/2021 | Takano | H04W 72/30 |
| 2022/0303729 | A1* | 9/2022 | Xu | H04W 4/06 |
| 2022/0303730 | A1* | 9/2022 | Xu | H04L 1/1642 |
| 2022/0322291 | A1* | 10/2022 | Wang | H04W 76/40 |

FOREIGN PATENT DOCUMENTS

| | | |
|---|---|---|
| CN | 110972078 A | 4/2020 |
| EP | 4210422 A1 | 7/2023 |

OTHER PUBLICATIONS

Intel Corporation:"MBS L2 Architecture, user plane and control plane".3GPP TSG-RAN WG2 Meeting #112-e, R2-2009196, Electronic meeting, Nov. 2-13, 2020, total 9 pages.

European Office Action issued in corresponding European Application No. 20961943.6, dated Jun. 28, 2024, pp. 1-8.

CATT, Consideration on Idle and Inactive mode Ues. 3GPP TSG RAN WG2#111-e, Electronic meeting, Aug. 17-Aug. 28, R2-2006597, 9 pages.

Extended European Search Report issued in corresponding European Application No. 20961943.6, dated Aug. 22, 2023, pp. 1-13.

Motorola Mobility et al: "PDU Session Establishment/Modification for Trusted Non-3GPP Access", 3GPP Draft; S2-1903343_5WWWC_PDU Session Establ_Disc_V1, 3rd Generation Partnership Project (3GPP), Mobile Competence Centre; 650, Route Deslucioles; F-06921 Sophia-Antipolis Cedex; France, vol. SAWG2, No. Xi'an, P.R. China; Apr. 8, 2019-Apr. 12, 2019 2 Apr. 2, 2019, XP051719506, total 3 pages.

European Office Action issued in corresponding European Application No. 20961943.6, dated Dec. 16, 2024, pp. 1-8.

Chinese First Office Action issued in corresponding Chinese Application No. 202080106724.8, dated Mar. 22, 2025, pp. 1-72.

CATT, "Summary of Email Discussion [Post111-e][906][MBS] Idle mode support", 3GPP TSG-RAN WG2 Meeting #112e R2-2008796, Oct. 23, 2020, total 56 pages.

International Search Report issued in corresponding International Application No. PCT/CN2020/130166, mailed Jul. 27, 2021, pp. 1-9.

Chinese Office Action issued in corresponding Chinese Application No. 202080106724.8, dated Jul. 31, 2025, pp. 1-10.

* cited by examiner

102

Wireless communication system

101

Downlink

Uplink

Core network
device

Network device

Terminal device

MCCH

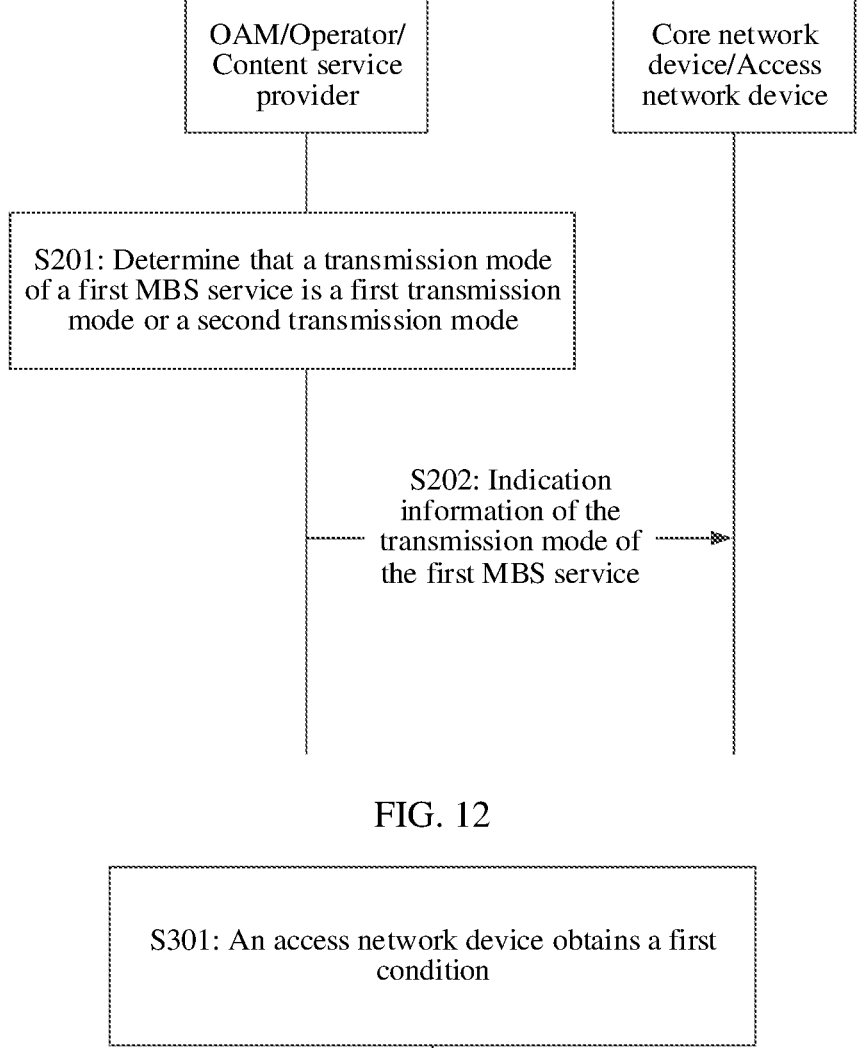

| OAM/Operator/ Content service provider | Core network device/Access network device |
|---|---|

S201: Determine that a transmission mode of a first MBS service is a first transmission mode or a second transmission mode S202: Indication information of the transmission mode of the first MBS service

FIG. 12

S301: An access network device obtains a first condition

S302: The access network device determines whether a transmission mode of a first MBS service is a first transmission mode or a second transmission mode based on the first condition

FIG. 13

COMMUNICATION METHOD AND APPARATUS

CROSS-REFERENCE TO RELATED APPLICATIONS

This application is a continuation of International Application No. PCT/CN2020/130166, filed on Nov. 19, 2020, the disclosure of which is hereby incorporated by reference in its entirety.

BACKGROUND

Broadcast multicast services are mainly applicable to services such as live streaming and scheduled program playing oriented to a plurality of terminal devices, so that the broadcast multicast services are simultaneously sent to the plurality of terminal devices via a network device.

The broadcast multicast service may be sent by the network device to the terminal device in a unicast (unicast) form through a dedicated bearer established for the terminal device, or may be sent to the terminal device in a multicast (multicast) form through a dedicated bearer established for the broadcast multicast service. To receive a broadcast multicast service that the terminal device is interested in, the terminal device needs to indicate, to an access network device, the broadcast multicast service that the terminal device is interested in.

In conclusion, currently, the terminal device needs to indicate, to the access network device, all broadcast multicast services that the terminal device is interested in, causing some unnecessary uplink overheads.

SUMMARY

Embodiments described herein provide a communication method and apparatus, to reduce signaling overheads in an MBS service transmission related process.

According to a first aspect, at least one embodiment provides a communication method. The method is performed by an access network device or a component such as a processor, a chip, or a chip system in an access network device.

According to the method, the access network device determines that a transmission mode of a first broadcast multicast service is a first transmission mode, where the first transmission mode is a transmission mode in which a broadcast multicast service is received in any one of a connected state, an inactive state, or an idle state. The access network device sends first information to a terminal device, where the first information is used to request broadcast multicast service interest indication information. The broadcast multicast service interest indication information indicates whether the terminal device is interested in the first broadcast multicast service and/or whether the terminal device is receiving the first broadcast multicast service. The access network device further receives the broadcast multicast service interest indication information.

By using the foregoing method, the terminal device reports the broadcast multicast service interest indication information of the first broadcast multicast service to the access network device, where the transmission mode of the first broadcast multicast service is the first transmission mode. Therefore, the terminal device no longer reports information indicating whether the terminal device is interested in another broadcast multicast service and information indicating whether the terminal device is receiving another broadcast multicast service, thereby reducing uplink overheads.

In at least one embodiment, the access network device further receives second information, and determine that the transmission mode of the first broadcast multicast service is the first transmission mode based on the second information. By using the design, the access network device determines that the transmission mode of the first broadcast multicast service is the first transmission mode based on the second information.

In at least one embodiment, the second information is determined by a core network device and/or an operation administration and maintenance, so that a core network and/or an operator determines or sets or configures or manages a transmission mode of a broadcast multicast service.

In at least one embodiment, the access network device determines whether a broadcast multicast service meets a first condition, where the broadcast multicast service that meets the first condition is the first broadcast multicast service. By using the design, the access network device determines a transmission mode corresponding to a broadcast multicast service. The access network device further receives third information from the core network device, and the third information indicates the first condition. The first condition is, for example, a QoS condition.

In at least one embodiment, the access network device sends fourth information to the core network device, where the fourth information indicates that the transmission mode of the first broadcast multicast service is the first transmission mode. By using the design, in response to the access network device determining the transmission mode corresponding to the broadcast multicast service, the access network device indicates the transmission mode corresponding to the broadcast multicast service to the core network device.

In at least one embodiment, the broadcast multicast service interest indication information includes at least one of information indicating that the terminal device is interested in the first broadcast multicast service, information indicating that the terminal device is not interested in the first broadcast multicast service, information indicating that the terminal device is receiving the first broadcast multicast service information, or information indicating that the terminal device is not receiving the first broadcast multicast service. By using the design, the broadcast multicast service interest indication information is flexibly indicated.

In at least one embodiment, the second information includes at least one of an identifier of the first broadcast multicast service, a radio network temporary identifier used to schedule the first broadcast multicast service, a broadcast multicast service session identifier used to transmit the first broadcast multicast service, used to transmit the first broadcast multicast service, or request information used to request to obtain the broadcast multicast service interest indication information of the terminal device for the first broadcast multicast service. Therefore, the access network device flexibly requests to obtain the broadcast multicast service interest indication information of the terminal device.

According to a second aspect, at least one embodiment provides a communication method. The method is performed by a core network device or a component such as a processor, a chip, or a chip system in a core network device.

According to the method, the core network device determines that a transmission mode of a first broadcast multicast service is a first transmission mode, where the first transmission mode is a transmission mode in which a broadcast multicast service is received in any one of a connected state, an inactive state, or an idle state. The core network device further sends information indicating that the transmission mode of the first broadcast multicast service is the first transmission mode.

The information indicating that the transmission mode of the first broadcast multicast service is the first transmission mode includes second information sent to an access network device. Alternatively, the information indicating that the transmission mode of the first broadcast multicast service is the first transmission mode includes sixth information sent to a terminal device.

In at least one embodiment, the core network device determines whether a broadcast multicast service meets a first condition, where the broadcast multicast service that meets the first condition is the first broadcast multicast service.

In at least one embodiment, the core network device further receives fifth information, and determine that the transmission mode of the first broadcast multicast service is the first transmission mode based on the fifth information.

In at least one embodiment, the core network device receives the fifth information from an operation administration and maintenance.

In at least one embodiment, the first broadcast multicast service is a service of interest indicated by the terminal device.

In at least one embodiment, the core network device sends, to the terminal device or the access network device, the information indicating that the transmission mode of the first broadcast multicast service is the first transmission mode. Therefore, the access network device or the terminal device learns that the transmission mode of the first broadcast multicast service is the first transmission mode. In response to the terminal device learning that the transmission mode of the first broadcast multicast service is the first transmission mode, the terminal device actively sends broadcast multicast service interest indication information to the access network device.

The access network device in the second aspect is alternatively replaced with an OAM system or apparatus or device.

For beneficial effects shown in the second aspect, refer to the beneficial effects of the first aspect.

According to a third aspect, at least one embodiment provides a communication method. The method is performed by a terminal device or a component such as a processor, a chip, or a chip system in a terminal device.

The terminal device receives first information from an access network device, where the first information is used to request to obtain broadcast multicast service interest indication information of the terminal device for a first broadcast multicast service. A first transmission mode is a transmission mode in which a broadcast multicast service is received in any one of a connected state, an inactive state, or an idle state. The terminal device further sends the broadcast multicast service interest indication information of the first broadcast multicast service to the access network device. The broadcast multicast service interest indication information indicates whether the terminal device is interested in the first broadcast multicast service and/or whether the terminal device is receiving the first broadcast multicast service.

For beneficial effects shown in the third aspect, refer to the beneficial effects of the first aspect.

According to a fourth aspect, at least one embodiment provides a communication method. The method is performed by a terminal device or a component such as a processor, a chip, or a chip system in a terminal device.

According to the method, the terminal device obtains sixth information, where the sixth information indicates that a transmission mode of a first broadcast multicast service is a first transmission mode, and the first transmission mode is a transmission mode in which a broadcast multicast service is received in any one of a connected state, an inactive state, or an idle state. The terminal device further sends broadcast multicast service interest indication information of the terminal device for the first broadcast multicast service to an access network device. The broadcast multicast service interest indication information indicates whether the terminal device is interested in the first broadcast multicast service and/or whether the terminal device is receiving the first broadcast multicast service.

By using the foregoing method, the terminal device reports the broadcast multicast service interest indication information of the first broadcast multicast service to the access network device, where the transmission mode of the first broadcast multicast service is the first transmission mode. Therefore, the terminal device no longer reports information indicating whether the terminal device is interested in another broadcast multicast service and information indicating whether the terminal device is receiving another broadcast multicast service, thereby reducing uplink overheads.

In at least one embodiment, the terminal device receives the sixth information from a core network device or a server.

In at least one embodiment, in response to the sixth information being from the core network device, before obtaining the sixth information, the terminal device sends seventh information to the core network device, where the seventh information is used to request to register with a core network. The seventh information indicates at least one broadcast multicast service, and the at least one broadcast multicast service includes the first broadcast multicast service.

In at least one embodiment, in response to the sixth information being from the server, before obtaining the sixth information, the terminal device sends seventh information to the server, where the seventh information is used to request to register with the server. The seventh information indicates at least one broadcast multicast service, and the at least one broadcast multicast service includes the first broadcast multicast service.

In at least one embodiment, in response to the sixth information being from the server, after obtaining the sixth information, the terminal device sends seventh information to the core network device, where the seventh information is used to request to register with a core network. The seventh information indicates at least one broadcast multicast service, and the at least one broadcast multicast service includes the first broadcast multicast service.

In at least one embodiment, the first broadcast multicast service is a broadcast multicast service of interest indicated by the terminal device.

According to a fifth aspect, at least one embodiment provides a communication method. The method is performed by an access network device or a component such as a processor, a chip, or a chip system in an access network device.

According to the method, the access network device receives broadcast multicast service interest indication information from a terminal device, where the broadcast multicast service interest indication information indicates whether the terminal device is interested in a first broadcast multicast service and/or whether the terminal device is receiving a first broadcast multicast service. A transmission mode of the first broadcast multicast service is a first transmission mode, and the first transmission mode is a transmission mode in which a broadcast multicast service is received in any one of a connected state, an inactive state, or an idle state.

For beneficial effects shown in the fifth aspect, refer to the beneficial effects of the fourth aspect.

According to a sixth aspect, at least one embodiment provides a communication method. The method is performed by an OAM or an operator or a content service provider, or a component such as a processor, a chip, or a chip system in an OAM or an operator or a content service provider.

For example, the method is performed by the OAM. According to the method, the OAM determines that a transmission mode of a first broadcast multicast service is a first transmission mode or a second transmission mode. The OAM further sends indication information of the transmission mode of the first broadcast multicast service. The indication information indicates that the transmission mode of the first broadcast multicast service is the first transmission mode or the second transmission mode.

Correspondingly, the indication information is received by an access network device and/or a core network device. In response to the core network device receiving the indication information, the core network device further sends, to the access network device, the indication information indicating that the transmission mode of the first broadcast multicast service is the first transmission mode or the second transmission mode. In response to the access network device receiving the indication information, the access network device further sends, to the core network device, the indication information indicating that the transmission mode of the first broadcast multicast service is the first transmission mode or the second transmission mode.

By using the foregoing method, the OAM determines the indication information of the transmission mode of the first broadcast multicast service and indicate the indication information of the transmission mode of the first broadcast multicast service to the access network device and/or the core network device.

According to a seventh aspect, at least one embodiment provides a communication method. The method is performed by an access network device or a component such as a processor, a chip, or a chip system in an access network device.

For example, the method is performed by the access network device. According to the method, the access network device obtains a first condition, and determine that a transmission mode of a first broadcast multicast service is a first transmission mode or a second transmission mode based on the first condition. The first condition is, for example, a QoS condition or an identifier of a broadcast multicast service in the first transmission mode and/or the second transmission mode.

By using the foregoing method, the access network device determines indication information of the transmission mode of the first broadcast multicast service.

According to an eighth aspect, at least one embodiment provides a communication method. The method is performed by a core network device or a component such as a processor, a chip, or a chip system in a core network device.

For example, the method is performed by the core network device. According to the method, the core network device determines that a transmission mode of a first broadcast multicast service is a first transmission mode or a second transmission mode. The core network device sends indication information of the transmission mode of the multicast/multicast service to an access network device.

By using the foregoing method, the core network device determines the indication information of the transmission mode of the first broadcast multicast service and indicate the indication information of the transmission mode of the first broadcast multicast service to the access network device.

According to a ninth aspect, at least one embodiment provides a communication apparatus, which implements the method implemented by the access network device in the first aspect. The apparatus includes a corresponding module, unit, or component configured to perform the foregoing method. The module included in the apparatus is implemented in a software and/or hardware manner. The apparatus is, for example, an access network device, or a component, a baseband chip, a chip system, a processor, or the like that supports an access network device in implementing the foregoing method.

For example, the communication apparatus includes modular components such as a transceiver module or a communication module, and a processing module or a processing unit. These modules performs corresponding functions of the access network device in the first aspect. In response to the communication apparatus being the access network device, the transceiver module is a sender and a receiver, or a transceiver obtained by integrating a sender and a receiver. The transceiver module includes a communication interface, an antenna, a radio frequency circuit, and/or the like. The processing module is a processor, for example, a baseband chip. In response to the communication apparatus being a component having a function of the access network device, the transceiver module is a radio frequency module or a communication interface, and the processing module is a processor. In response to the communication apparatus being the chip system, the transceiver module is an input/output interface of the chip system, and the processing module is a processor of the chip system, for example, a central processing unit (central processing unit, CPU).

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

The transceiver module or the transceiver is configured to perform a receiving action and/or a sending action performed by the access network device in the first aspect. The processing module or the processor is configured to perform other actions than receiving and sending performed by the access network device in the first aspect.

In response to performing the method shown in the first aspect, the processing module or the processor determines that a transmission mode of a first broadcast multicast service is a first transmission mode, where the first transmission mode is a transmission mode in which a broadcast multicast service is received in any one of a connected state, an inactive state, or an idle state. The transceiver module or the transceiver sends first information to a terminal device, where the first information is used to request broadcast multicast service interest indication information. The broadcast multicast service interest indication information indicates whether the terminal device is interested in the first broadcast multicast service and/or whether the terminal device is receiving the first broadcast multicast service. The transceiver module or the transceiver further receives the broadcast multicast service interest indication information.

In at least one embodiment, the transceiver module or the transceiver further receives second information, and the processing module or the processor determines that the transmission mode of the first broadcast multicast service is the first transmission mode based on the second information.

In at least one embodiment, the transmission mode of the first broadcast multicast service is determined by a core network device and/or an operation administration and maintenance.

In at least one embodiment, the processing module or the processor determines whether a broadcast multicast service meets a first condition, where the broadcast multicast service that meets the first condition is the first broadcast multicast service.

In at least one embodiment, the transceiver module or the transceiver sends fourth information to the core network device, where the fourth information indicates that the transmission mode of the first broadcast multicast service is the first transmission mode.

In at least one embodiment, the broadcast multicast service interest indication information includes at least one of information indicating that the terminal device is interested in the first broadcast multicast service, information indicating that the terminal device is not interested in the first broadcast multicast service, information indicating that the terminal device is receiving the first broadcast multicast service information, or information indicating that the terminal device is not receiving the first broadcast multicast service.

In at least one embodiment, the second information includes at least one of an identifier of the first broadcast multicast service, a radio network temporary identifier used to schedule the first broadcast multicast service, a broadcast multicast session identifier used to transmit the first broadcast multicast service, used to transmit the first broadcast multicast service, or request information used to request to obtain the broadcast multicast service interest indication information of the terminal device for the first broadcast multicast service.

For beneficial effects shown in the ninth aspect, refer to the beneficial effects of the first aspect.

According to a tenth aspect, at least one embodiment provides a communication apparatus, which implements the method implemented by the core network device in the second aspect. The apparatus includes a corresponding module or component configured to perform the foregoing method. The module included in the apparatus is implemented in a software and/or hardware manner. The apparatus is, for example, a core network device, or a component, a baseband chip, a chip system, a processor, or the like that supports a core network device in implementing the foregoing method.

For example, the communication apparatus includes modular components such as a transceiver module or a communication module, and a processing module. These modules performs corresponding functions of the core network device in the second aspect. In response to the communication apparatus being the core network device, the transceiver module is a sender and a receiver, or a transceiver obtained by integrating a sender and a receiver. The transceiver module includes a communication interface, an antenna, a radio frequency circuit, and/or the like. The processing module is a processor, for example, a baseband chip. In response to the communication apparatus being a component having a function of the core network device, the transceiver module is a radio frequency module or a communication interface, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

The transceiver module or the transceiver is configured to perform a receiving action and/or a sending action performed by the core network device in the second aspect. The processing module or the processor is configured to perform other actions than receiving and sending performed by the core network device in the second aspect.

In response to performing the method shown in the second aspect, the processing module or the processor determines that a transmission mode of a first broadcast multicast service is a first transmission mode, where the first transmission mode is a transmission mode in which a broadcast multicast service is received in any one of a connected state, an inactive state, or an idle state. The transceiver module or the transceiver sends information indicating that the transmission mode of the first broadcast multicast service is the first transmission mode.

The information indicating that the transmission mode of the first broadcast multicast service is the first transmission mode includes second information sent to an access network device. The information indicating that the transmission mode of the first broadcast multicast service is the first transmission mode includes sixth information sent to a terminal device.

In at least one embodiment, the processing module or the processor determines whether a broadcast multicast service meets a first condition.

In at least one embodiment, the transceiver module or the transceiver further receives fifth information, and the processing module or the processor determines that the transmission mode of the first broadcast multicast service is the first transmission mode based on the fifth information.

In at least one embodiment, the transceiver module or the transceiver further receives the fifth information from an operation administration and maintenance.

In at least one embodiment, the first broadcast multicast service is a service of interest indicated by the terminal device.

In at least one embodiment, the transceiver module or the transceiver sends, to the access network device or the terminal device, the information indicating that the transmission mode of the first broadcast multicast service is the first transmission mode.

For beneficial effects shown in the tenth aspect, refer to the beneficial effects of the first aspect.

According to an eleventh aspect, at least one embodiment provides a communication apparatus, which implements the method implemented by the terminal device in the third aspect. The apparatus includes a corresponding module or component configured to perform the foregoing method. The module included in the apparatus is implemented in a software and/or hardware manner. The apparatus is, for example, a terminal device, or a component, a baseband chip, a chip system, a processor, or the like that supports a terminal device in implementing the foregoing method.

For example, the communication apparatus includes modular components such as a transceiver module or a communication module, and a processing module. These modules performs corresponding functions of the terminal device in the third aspect. In response to the communication apparatus being the terminal device, the transceiver module is a sender and/or a receiver, or a transceiver obtained by integrating a sender and a receiver. The transceiver module includes an antenna, a radio frequency circuit, and the like. The processing module is a processor, for example, a baseband chip. In response to the communication apparatus being a component having a function of the terminal device, the transceiver module is a radio frequency module, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

The transceiver module or the transceiver is configured to perform a receiving action and/or a sending action performed by the terminal device in the third aspect. The processing module or the processor is configured to perform other actions than receiving and sending performed by the terminal device in the third aspect.

For example, the transceiver module or the transceiver receives first information from an access network device, where the first information is used to request to obtain broadcast multicast service interest indication information of the terminal device for a first broadcast multicast service. A first transmission mode is a transmission mode in which a broadcast multicast service is received in any one of a connected state, an inactive state, or an idle state. The transceiver module or the transceiver further sends the broadcast multicast service interest indication information of the terminal device for the first broadcast multicast service to the access network device. The broadcast multicast service interest indication information indicates whether the terminal device is interested in the first broadcast multicast service and/or whether the terminal device is receiving the first broadcast multicast service.

For beneficial effects shown in the eleventh aspect, refer to the beneficial effects of the first aspect.

According to a twelfth aspect, at least one embodiment provides a communication apparatus, which implements the method implemented by the terminal device in the fourth aspect. The apparatus includes a corresponding module, unit, or component configured to perform the foregoing method. The module included in the apparatus is implemented in a software and/or hardware manner. The apparatus is, for example, a terminal device, or a component, a baseband chip, a chip system, a processor, or the like that supports a terminal device in implementing the foregoing method.

For example, the communication apparatus includes modular components such as a transceiver module or a communication unit, and a processing module or a processing unit. These modules performs corresponding functions of the terminal device in the fourth aspect. In response to the communication apparatus being the terminal device, the transceiver module is a sender and/or a receiver, or a transceiver obtained by integrating a sender and a receiver. The transceiver module includes an antenna, a radio frequency circuit, and the like. The processing module is a processor, for example, a baseband chip. In response to the communication apparatus being a component having a function of the terminal device, the transceiver module is a radio frequency module, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

The transceiver module or the transceiver is configured to perform a receiving action and/or a sending action performed by the terminal device in the fourth aspect. The processing module or the processor is configured to perform other actions than receiving and sending performed by the terminal device in the fourth aspect.

For example, the processing module or the processor or the transceiver module or the transceiver or a receiving module obtains sixth information, where the sixth information indicates that a transmission mode of a first broadcast multicast service is a first transmission mode, and the first transmission mode is a transmission mode in which a broadcast multicast service is received in any one of a connected state, an inactive state, or an idle state. The transceiver module or the transceiver or a sending module further sends broadcast multicast service interest indication information of the terminal device for the first broadcast multicast service to an access network device. The broadcast multicast service interest indication information indicates whether to be interested in the first broadcast multicast service and/or whether the first broadcast multicast service is being received.

In at least one embodiment, the transceiver module or the transceiver receives the sixth information from a core network device or a server.

In at least one embodiment, in response to the sixth information being from the core network device, before obtaining the sixth information, the transceiver module or the transceiver sends seventh information to the core network device, where the seventh information indicates at least one broadcast multicast service, and the at least one broadcast multicast service includes the first broadcast multicast service.

In at least one embodiment, in response to the sixth information being from the server, before obtaining the sixth information, the transceiver module or the transceiver sends seventh information to the server, where the seventh information is used to request to register with the server. The seventh information indicates at least one broadcast multicast service, and the at least one broadcast multicast service includes the first broadcast multicast service.

In at least one embodiment, in response to the sixth information being from the server, after obtaining the sixth information, the transceiver module or the transceiver sends seventh information to the core network device, where the seventh information is used to request to register with a core network. The seventh information indicates at least one broadcast multicast service, and the at least one broadcast multicast service includes the first broadcast multicast service.

In at least one embodiment, the first broadcast multicast service is a broadcast multicast service of interest indicated by the terminal device.

For beneficial effects shown in the twelfth aspect, refer to the beneficial effects of the fourth aspect.

According to a thirteenth aspect, at least one embodiment provides a communication apparatus, which implement the method implemented by the access network device in the fifth aspect. The apparatus includes a corresponding module or component configured to perform the foregoing method. The module included in the apparatus is implemented in a software and/or hardware manner. The apparatus is, for example, an access network device, or a component, a baseband chip, a chip system, a processor, or the like that supports an access network device in implementing the foregoing method.

For example, the communication apparatus includes modular components such as a transceiver module or a communication unit, and a processing module or a processing unit. These modules performs corresponding functions of the access network device in the fifth aspect. In response to the communication apparatus being the access network device, the transceiver module is a communication interface, a sender and/or a receiver, or a transceiver obtained by integrating a sender and a receiver. The transceiver module includes an antenna, a radio frequency circuit, and the like. The processing module is a processor, for example, a baseband chip. In response to the communication apparatus being a component having a function of the access network device, the transceiver module is a radio frequency module or a communication interface, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

The transceiver module or the transceiver is configured to perform a receiving action and/or a sending action performed by the access network device in the fifth aspect. The processing module or the processor is configured to perform other actions than receiving and sending performed by the access network device in the fifth aspect.

According to the method, the transceiver module or the transceiver receives broadcast multicast service interest indication information of a terminal device for a first broadcast multicast service, where a transmission mode of the first broadcast multicast service is a first transmission mode, and the first transmission mode is a transmission mode in which a broadcast multicast service is received in any one of a connected state, an inactive state, or an idle state. The broadcast multicast service interest indication information indicates whether to be interested in the first broadcast multicast service and/or whether the first broadcast multicast service is being received.

For beneficial effects shown in the thirteenth aspect, refer to the beneficial effects of the fourth aspect.

According to a fourteenth aspect, at least one embodiment provides a communication apparatus, which implements the method implemented by an OAM, an operator, or a content service provider in the sixth aspect. The apparatus includes a corresponding module or component configured to perform the foregoing method. The module included in the apparatus is implemented in a software and/or hardware manner. For example, the apparatus is an OAM system or apparatus or device, an operator system or apparatus or device, a content service provider system or apparatus or device, or a component, a baseband chip, a chip system, or a processor that supports an OAM or an operator or a content service provider or apparatus or device in implementing the foregoing method.

For example, the communication apparatus includes modular components such as a transceiver module or a communication unit, and a processing module or a processing unit. These modules performs corresponding functions of the OAM or the operator or the content service provider in the sixth aspect. In response to the communication apparatus being the OAM system or the operator system or the content service provider system, the transceiver module is a communication interface, a sender and/or a receiver, or a transceiver obtained by integrating a sender and a receiver. The transceiver module includes an antenna, a radio frequency circuit, and the like. The processing module is a processor, for example, a baseband chip. In response to the communication apparatus being a component having a function of the OAM or the operator or the content service provider, the transceiver module is a radio frequency module or a communication interface, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

In response to performing the method shown in the sixth aspect, the processing module or the processor determines that a transmission mode of a first broadcast multicast service is a first transmission mode or a second transmission mode. The transceiver module or the transceiver sends indication information of the transmission mode of the first broadcast multicast service. The indication information indicates that the transmission mode of the first broadcast multicast service is the first transmission mode or the second transmission mode.

For beneficial effects shown in the fourteenth aspect, refer to the beneficial effects in the sixth aspect.

According to a fifteenth aspect, at least one embodiment provides a communication apparatus, which implements the method implemented by the access network device in the seventh aspect. The apparatus includes a corresponding module or component configured to perform the foregoing method. The module included in the apparatus is implemented in a software and/or hardware manner. The apparatus is, for example, an access network device, or a component, a baseband chip, a chip system, a processor, or the like that supports an access network device in implementing the foregoing method.

For example, the communication apparatus includes modular components such as a transceiver module or a communication unit, and a processing module or a processing unit. These modules performs corresponding functions of the access network device in the seventh aspect. In response to the communication apparatus being the access network device, the transceiver module is a communication interface, a sender and/or a receiver, or a transceiver obtained by integrating a sender and a receiver. The transceiver module includes an antenna, a radio frequency circuit, and the like. The processing module is a processor, for example, a baseband chip. In response to the communication apparatus being a component having a function of the access network device, the transceiver module is a radio frequency module or a communication interface, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

In response to performing the method shown in the seventh aspect, the processing module or the processor obtains a first condition, and determine that a transmission mode of a first broadcast multicast service is a first transmission mode or a second transmission mode based on the first condition. The first condition is, for example, a QoS condition or an identifier of a broadcast multicast service in the first transmission mode and/or the second transmission mode.

For beneficial effects shown in the fifteenth aspect, refer to the beneficial effects of the seventh aspect.

According to a sixteenth aspect, at least one embodiment provides a communication apparatus, which implements the method implemented by the core network device in the eighth aspect. The apparatus includes a corresponding module or component configured to perform the foregoing method. The module included in the apparatus is implemented in a software and/or hardware manner. The apparatus is, for example, a core network device, or a component, a baseband chip, a chip system, a processor, or the like that supports a core network device in implementing the foregoing method.

For example, the communication apparatus includes modular components such as a transceiver module or a communication module, and a processing module or a processing unit. These modules performs corresponding functions of the core network device in the eighth aspect. In response to the communication apparatus being the core network device, the transceiver module is a sender and a receiver, or a transceiver obtained by integrating a sender and a receiver. The transceiver module includes a communication interface, an antenna, a radio frequency circuit, and/or the like. The processing module is a processor, for example, a baseband chip. In response to the communication apparatus being a component having a function of the core network device, the transceiver module is a radio frequency module or a communication interface, and the processing module is a processor. In response to the communication apparatus being a chip system, the transceiver module is an input/output interface of the chip system, and the processing module is a processor of the chip system, for example, a CPU.

Optionally, in response to the communication apparatus being implemented by using a software module, the communication apparatus includes a transceiver module and/or a processing module. In response to the communication apparatus being implemented by using a hardware component, the communication apparatus includes a transceiver and/or a processor.

The transceiver module or the transceiver is configured to perform a receiving action and/or a sending action performed by the core network device in the eighth aspect. The processing module or the processor is configured to perform other actions than receiving and sending performed by the core network device in the eighth aspect.

In response to performing the method shown in the eighth aspect, the processing module or the processor determines that a transmission mode of a first broadcast multicast service is a first transmission mode or a second transmission mode. The transceiver module or the transceiver sends indication information of the transmission mode of the first broadcast multicast service. The indication information indicates that the transmission mode of the first broadcast multicast service is the first transmission mode or the second transmission mode.

For beneficial effects shown in the sixteenth aspect, refer to the beneficial effects of the eighth aspect.

According to a seventeenth aspect, a communication system is provided. The communication system includes the communication apparatuses shown in any two or more of the ninth aspect to the eleventh aspect. Alternatively, the communication system includes the communication apparatuses shown in any two or more of the tenth aspect, the twelfth aspect, and the thirteenth aspect. Alternatively, the communication system includes the communication apparatus and the core network device and/or the access network device shown in the fifteenth aspect. Alternatively, the communication system includes the communication apparatus and the access network device shown in the sixteenth aspect. Alternatively, the communication system includes the communication apparatus shown in the seventeenth aspect.

According to an eighteenth aspect, a computer-readable storage medium is provided, where the computer-readable storage medium is configured to store computer instructions, and in response to the computer instructions running on a computer, the computer is enabled to perform the method shown in the first aspect to the eighth aspect or any possible implementation of the first aspect to the eighth aspect.

According to a nineteenth aspect, a computer program product including instructions is provided. The computer program product is configured to store computer instructions. In response to the computer instructions running on a computer, the computer is enabled to perform the method shown in the first aspect to the eighth aspect.

According to a twentieth aspect, a circuit is provided, where the circuit is coupled to a memory, and the circuit is configured to perform the method shown in the first aspect to the eighth aspect. The circuit includes a chip and/or a chip circuit.

BRIEF DESCRIPTION OF DRAWINGS

FIG. 12 is a schematic flowchart of another communication method according to at least one embodiment;

FIG. 13 is a schematic flowchart of another communication method according to at least one embodiment;

DESCRIPTION OF EMBODIMENTS

To make the objectives, technical solutions, and advantages of at least one embodiment clearer, the following further describes embodiments in detail with reference to the accompanying drawings. A specific operation method in method embodiments is also applied to an apparatus embodiment or a system embodiment.

Figures 1, 2:
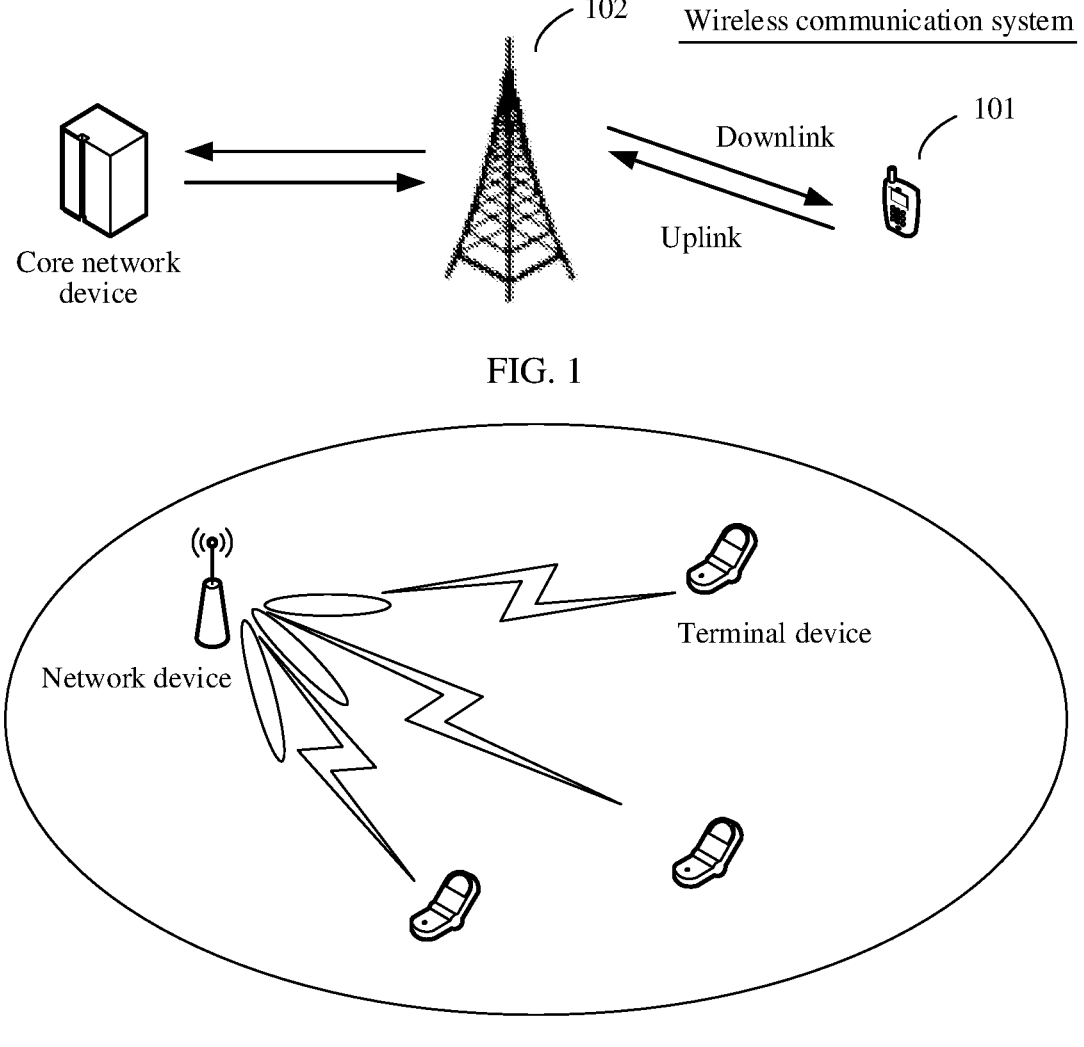
FIG. 1 is a schematic diagram of an architecture of a communication system according to at least one embodiment.
FIG. 2 is a schematic diagram of an architecture of another communication system according to at least one embodiment.

As shown in FIG. 1, a communication method provided in at least one embodiment is applied to a wireless communication system. The wireless communication system includes a terminal device 101, an access network device 102, and a core network device.

The foregoing wireless communication system is applicable to both a low frequency scenario (sub 6G) and a high frequency scenario (above 6G). An application scenario of the wireless communication system includes, but not limited to, a fifth generation system, a new radio (new radio, NR) communication system, a future evolved public land mobile network (public land mobile network, PLMN) system, a non-land mobile network, and the like.

The terminal device 101 shown above is user equipment (user equipment, UE), a terminal (terminal), an access terminal, a terminal unit, a terminal station, a mobile station (mobile station, MS), a remote station, a remote terminal, a mobile terminal (mobile terminal), a wireless communication device, a terminal agent, a terminal device, or the like. The terminal device 101 has a wireless transceiver function, and communicates (for example, perform wireless communication) with one or more network devices of one or more communication systems, and receive a network service provided by the network device. The network device herein includes, but not limited to, the access network device 102 shown in the figure.

The terminal device 101 is a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, or another processing device connected to a wireless modem, an in-vehicle device, a wearable device, a terminal apparatus in a future 5G network, a terminal apparatus in a further evolved PLMN, or the like.

In addition, the terminal device 101 is deployed on land, including an indoor or outdoor device, a handheld device, or an in-vehicle device; or the terminal device 101 is deployed on water, for example, on a ship; or the terminal device 101 is deployed in the air, for example, on an airplane, a balloon, or a satellite. The terminal device 101 is specifically a mobile phone (mobile phone), a tablet computer (pad), a computer having a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The terminal device 101 alternatively is a communication chip having a communication module, or is a vehicle having a communication function, or an in-vehicle device such as an in-vehicle communication apparatus or an in-vehicle communication chip.

The access network device 102 is a device configured to provide a network access function, for example, a radio access network (radio access network, RAN) base station. The access network device 102 specifically includes a base station (base station, BS) such as a RAN base station, or include a base station and a radio resource management device configured to control the base station, or the like. The access network device 102 further includes a relay station or a relay device, an access point, a base station in a future 5G network, a base station in a future evolved PLMN or an NR base station, and the like. The access network device 102 is a wearable device or an in-vehicle device. Alternatively, the access network device 102 is a communication chip having a communication module.

For example, the access network device 102 includes, but not limited to, a next-generation base station (g nodeB, gNB) in 5G and an evolved node B (evolved node B, eNB) in a long term evolution (long term evolution, LTE) system, a radio network controller (radio network controller, RNC), a radio controller in a cloud radio access network (cloud radio access network, CRAN) system, a base station controller (base station controller, BSC), a home base station (home evolved nodeB, or home nodeB, HNB), a baseband unit (baseBand, BBU), a transmitting and receiving point (transmitting and receiving point, TRP), a transmitting point (transmitting point, TP), a mobile switching center, and a base transceiver station (base transceiver station, BTS) in a global system for mobile communication (global system for mobile communication, GSM) or a code division multiple access (code division multiple access, CDMA) network, or is a node base station (node base station, NB) in wideband code division multiple access (wideband code division multiple access, WCDMA), or is an evolutional (evolutional)

NB (eNB or eNodeB) in LTE, or is a base station device in a future 5G network or an access network device in a future evolved PLMN network, or is a wearable device or an in-vehicle device.

In addition, as shown in FIG. 1, the access network device 102 is connected to a core network (core network, CN) device, and the core network device is configured to provide a core network service for the terminal device 101 connected to the access network device 102. The core network device corresponds to different devices in different systems. For example, in 4G, the core network device corresponds to a mobility management entity (mobility management entity, MME) and/or a serving gateway (serving gateway, S-GW). In 5G, the core network device corresponds to an access and mobility management function (access and mobility management function, AMF), a session management function (session management function, SMF), a user plane function (user plane function, UPF), or the like.

As shown in FIG. 2, in at least one embodiment, a network device further transmits data or controls signaling to a plurality of terminal devices, to transmit a broadcast multicast service. The network device herein is the access network device 102 shown in FIG. 1. The broadcast multicast service includes one or more of a multicast service, a multicast service, or a broadcast service. The broadcast multicast service is also referred to as a multicast/multicast service. Broadcast multicast in at least one embodiment includes, but not limited to, a multicast/multicast broadcast service (multicast broadcast service, MBS) in an NR system and a multimedia broadcast multicast service (multimedia broadcast multicast service, MBMS) in an LTE system. Subsequently, In at least one embodiment, the broadcast multicast service is referred to as an MBS service or an MBMS service.

For example, in response to an MBS service being performed, data of the MBS service is sent by the network device to the terminal device in a unicast (unicast or point to point, PTP) form through a dedicated bearer established by the network device for the terminal device, or is sent to the terminal device in a multicast (multicast or point to multipoint, PTM) form through a dedicated bearer established for the MBS service, or is simultaneously sent in a PTP form and a PTM form. In response to a large quantity of terminal devices being used to receive an MBS service, sending the service in the unicast PTP form establishes dedicated bearers for the large quantity of terminal devices, which consumes a large amount of resources. In response to the service being sent to the terminal devices in the multicast PTM form, only a bearer of the MBS in a PTM transmission form, for example, a multicast/multicast bearer or an MBS bearer, is able to be established, and all the terminal devices that are interested in the service receives the MBS service through the bearer. This saves air interface resources, improves spectrum utilization, and improves transmission efficiency.

Figures 3, 4:
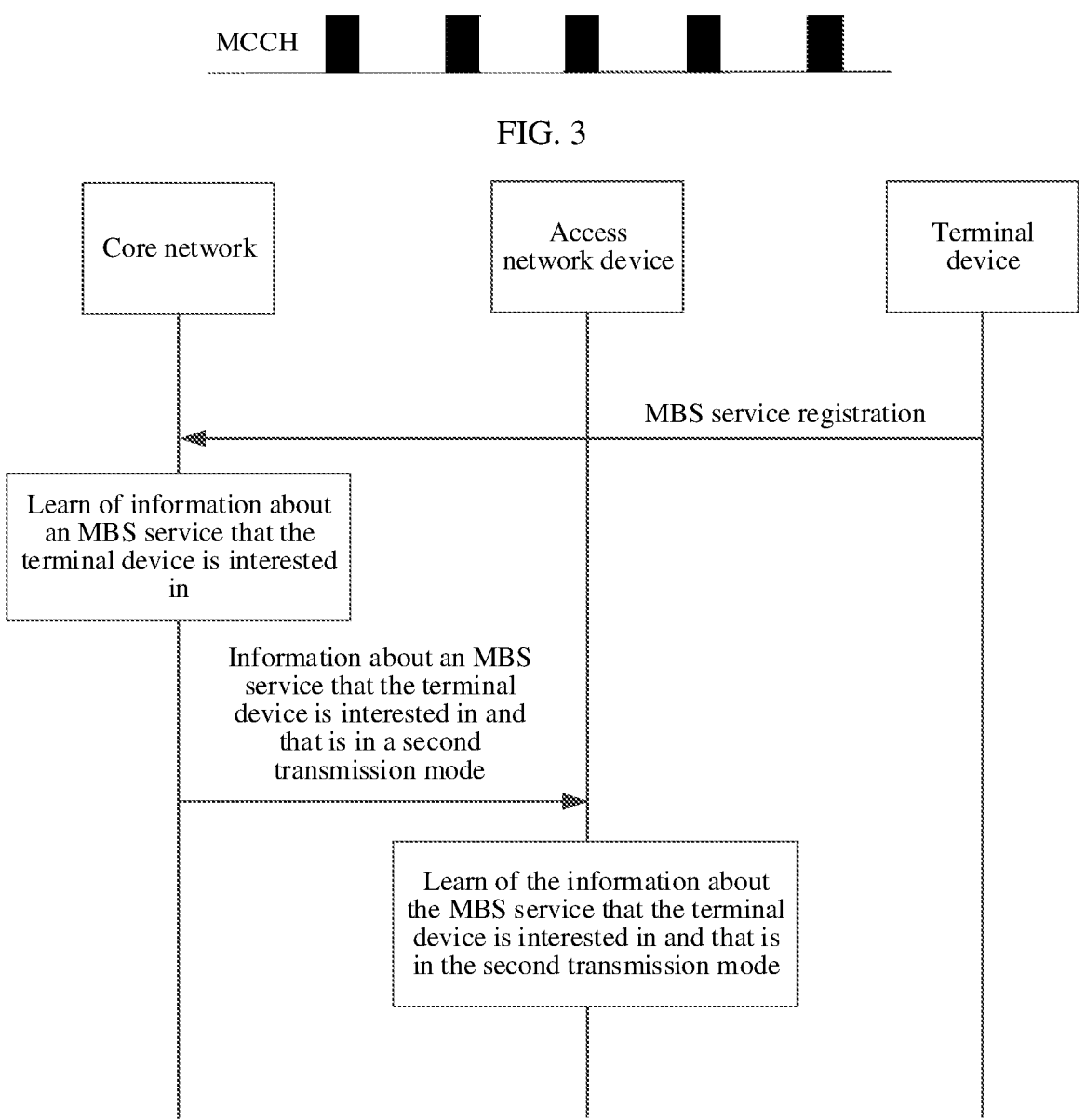
FIG. 3 is a schematic diagram of an MCCH channel according to at least one embodiment.
FIG. 4 is a schematic diagram of a registration process of an MBS service according to at least one embodiment.

Currently, in an MBS service transmission process, configuration information and/or a control message of an MBS service is transmitted through a (single cell) multicast control channel ((single cell) multicast control channel, (SC-) MCCH). The configuration information and/or the control message of the MBS service is also replaced with an MCCH message. The SC-MCCH or the SC-MCCH message is a cell-level configuration, that is, each cell is configured through the SC-MCCH. The message indicates an MBS session that is being performed and information about time in response to each session being scheduled, for example, a scheduling period (scheduling period), a scheduling window (scheduling window), and a start offset (start offset). The configuration/control message also provides information on whether a neighboring cell sends an MBS session. The (SC-) MCCH message is periodically sent in a configurable repetition period. As shown in FIG. 3, a black rectangular block indicates a time domain position of the (SC-) MCCH that is periodically sent. In other words, the (SC-) MCCH is broadcast repeatedly in a period in a cell performing an MBS service. A part of control information used to obtain the (SC-) MCCH message is transmitted through a broadcast control channel (broadcast control channel, BCCH).

For example, the configuration/control message includes one or more of the following configuration information: a period (sc-mcch-RepetitionPeriod) and an offset (offset) (sc-mcch-Offset) of the MCCH, a boundary (sc-mcch-ModificationPeriod) at which the MCCH periodically appears, a first subframe (sc-mcch-FirstSubframe) scheduled by the MCCH, duration (duration) (sc-mcch-duration) of scheduling the MCCH starting from the first subframe, or another parameter.

User data of the MBS service is transmitted through an (SC-) multicast traffic channel ((SC-) multicast traffic channel, (SC-) MTCH). The (SC-) MTCH is scheduled by using the (SC-) MCCH message, that is, a configuration of the (SC-) MTCH is carried in the (SC-) MCCH message. The configuration of the (SC-) MTCH is for each group radio network temporary identifier (group radio network temporary identifier, G-RNTI) level, or for each MBS service. A cell simultaneously schedules user data to a plurality of terminal devices by using the G-RNTI, and the terminal devices receive, based on the G-RNTI, the user data transmitted through the (SC-) MTCH. One G-RNTI corresponds to one or more MBS services. In addition, the G-RNTI is also used to schedule user data of an MBS service carried on another logical channel.

Currently, for some MBS services, the terminal device enters an RRC connected state to receive data corresponding to the MBS services. For example, the terminal device enters the connected state by receiving and responding to information that is from a core network and an MBS service is to be transmitted, and receives configuration information of the MBS service by using dedicated RRC (dedicated RRC) signaling in the RRC connected state and/or a system message. In at least one embodiment, "information indicating that the MBS service is to be transmitted" includes "information indicating that the MBS service starts", or "information indicating that the MBS service arrives", or "information indicating that data of the MBS service on a network side is to be sent", or "information indicating update of a configuration of the MBS service", or the like.

To ensure quality of service/a requirement of the MBS service, the network device configures a corresponding resource for the terminal device that receives the MBS service/these MBS services. The corresponding resource is, for example, a resource used for a hybrid automatic repeat request (hybrid automatic repeat request, HARQ), a resource used for a random access (random access, RA), and/or a physical resource that ensures a transmission rate. In at least one embodiment, these MBS services that use the terminal device to enter the RRC connected state to perform receiving is referred to as enhanced mode (enhanced mode) MBS services. Correspondingly, an MBS service that is received without in the RRC connected state is referred to as a normal mode (normal mode) MBS service. For ease of description, the normal mode MBS service is referred to as an MBS service in a first transmission mode. In other words, the first transmission mode is a transmission mode in which the MBS service is received in any one of an RRC connected state, an RRC inactive state, or an RRC idle state. In other words, in the first transmission mode, the terminal device does not to enter and/or maintain the RRC connected state due to receiving of a configuration and/or data of the MBS service. In addition, the enhanced mode MBS service is referred to as an MBS service in a second transmission mode. The second transmission mode is a transmission mode in which the MBS service is received only in the RRC connected state. In other words, the MBS service in the second transmission mode uses the terminal device to enter and/or maintain the RRC connected state due to receiving of a configuration and/or data of the MBS service. The second transmission mode is also referred to as a transmission mode of an MBS service that is available in a connected state (to be available in CONNECTED).

In addition, for some MBS services, the terminal device receives data corresponding to the MBS services in an RRC inactive (inactive) state or an RRC idle (idle) state without using the terminal device to enter and/or maintain the RRC connected state due to receiving of the MBS services.

In addition, as shown in FIG. 4, for some MBS services, the terminal device is able to report, through registration with a core network, information about an MBS service that the terminal device is interested in to the core network, and join a multicast group, so as to receive a configuration and data of the MBS service. For an MBS service received or sent in the second transmission mode, the core network further notifies an access network device of the MBS service that the terminal device is interested in and that is in the second transmission mode and/or an identifier of a corresponding terminal device that is interested in the MBS service, so that the access network device sends, to the terminal device based on the identifier, data of the MBS service that the terminal device is interested in and that is in the second transmission mode. The identifier of the corresponding terminal device indicates a terminal device that is interested in an MBS service in the second transmission mode. Because the access network device learns, from the core network, of the MBS service that the terminal device is interested in and that is in the second transmission mode, the terminal device is able to not indicate the MBS service that the terminal device is interested in and that is in the second transmission mode to the access network device, which increases uplink overheads. A manner in which the terminal device indicates the MBS service that the terminal device is interested in the access network device is, for example, sending, to the access network device, information indicating whether the terminal device is interested in the MBS service and/or is receiving the MBS service.

However, a terminal device that is interested in an MBS service in the first transmission mode and/or a terminal device that is receiving an MBS service in the first transmission mode does not register with the core network, that is, these terminal devices do not report, to the core network, information about the MBS service that the terminal devices are interested in, and do not join the multicast group. The core network does not notify the access network device of the information about the terminal device of the MBS service in the first transmission mode, and the terminal device includes the terminal device that is interested in the MBS service in the first transmission mode and/or that is receiving the MBS service in the first transmission mode. In other words, that the access network device does not know the information about the terminal device that is interested in the MBS service in the first transmission mode includes: The access network device does not know information about an MBS service that the terminal device is interested in or information about an MBS service that is being received by the terminal device.

To reduce uplink overheads in an MBS service transmission related process, at least one embodiment provides a communication method. The communication method is applied to the scenario shown in FIG. 1 or FIG. 2. The communication method is implemented by at least one of a terminal device, an access network device, or a core network device. The access network device includes the access network device 102 shown in FIG. 1 or the network device shown in FIG. 2. The terminal device includes the terminal device 101 shown in FIG. 1 or the terminal device shown in FIG. 2. The core network device includes the core network device shown in FIG. 1.

The following describes structures of the terminal device, the access network device, and the core network device with reference to the accompanying drawings.

Figure 5:
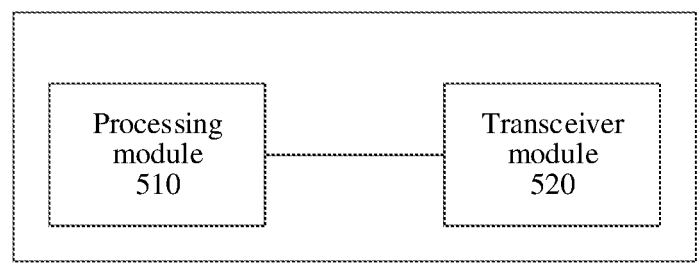
FIG. 5 is a schematic diagram of a structure of a communication apparatus according to at least one embodiment.

For example, FIG. 5 is a schematic diagram of a structure of a communication apparatus. The structure includes a processing module 510 and a transceiver module 520. For example, the structure shown in FIG. 5 is a terminal device, or is a chip used in a terminal device, or another combined device, member, or component having a function of a terminal device shown In at least one embodiment. In response to the structure being the terminal device, the transceiver module 520 includes a transceiver, and the transceiver includes an antenna, a radio frequency circuit, and the like.

The processing module 510 is a processor, for example, a baseband processor. The baseband processor includes one or more central processing units (central processing units, CPUs). In response to the structure being the component having the function of the terminal device shown in at least one embodiment, the transceiver module 520 is a radio frequency unit, and the processing module 510 is a processor, for example, a baseband processor. In response to the structure being a chip system, the transceiver module 520 is an input/output interface of a chip, and the processing module 510 is a processor of the chip system, and includes one or more central processing units. The chip herein is, for example, a baseband chip. In at least one embodiment, the processing module 510 is implemented as a processor or a processor-related circuit component, and the transceiver module 520 is implemented as a transceiver or a transceiver-related circuit component.

For example, the processing module 510 is configured to perform all operations, except sending and receiving operations, performed by the terminal device in at least one embodiment, for example, a processing operation, and/or another process used to support the technology described in at least one embodiment, for example, generating a message, information, and/or signaling sent by the transceiver module 520, and processing a message, information, and/or signaling received by the transceiver module 520. The transceiver module 520 is configured to perform all the receiving and sending operations performed by the terminal device in at least one embodiment and/or another process used to support the technology described in at least one embodiment.

In addition, the transceiver module 520 is a functional module. The functional module completes both the sending operation and the receiving operation. For example, the transceiver module 520 is configured to perform all the sending operations and receiving operations performed by the terminal device. For example, in response to performing the sending operation, the transceiver module 520 is considered as a sending module, and in response to performing the receiving operation, the transceiver module 520 is considered as a receiving module. Alternatively, the transceiver module 520 is two functional modules. The transceiver module 520 is considered as a collective name of the two functional modules. The two functional modules are respectively a sending module and a receiving module. The sending module is configured to complete the sending operation, for example, the sending module is configured to perform all the sending operations performed by the terminal device. The receiving module is configured to complete the receiving operation, and the receiving module is configured to perform all the receiving operations performed by the terminal device.

Figure 6:
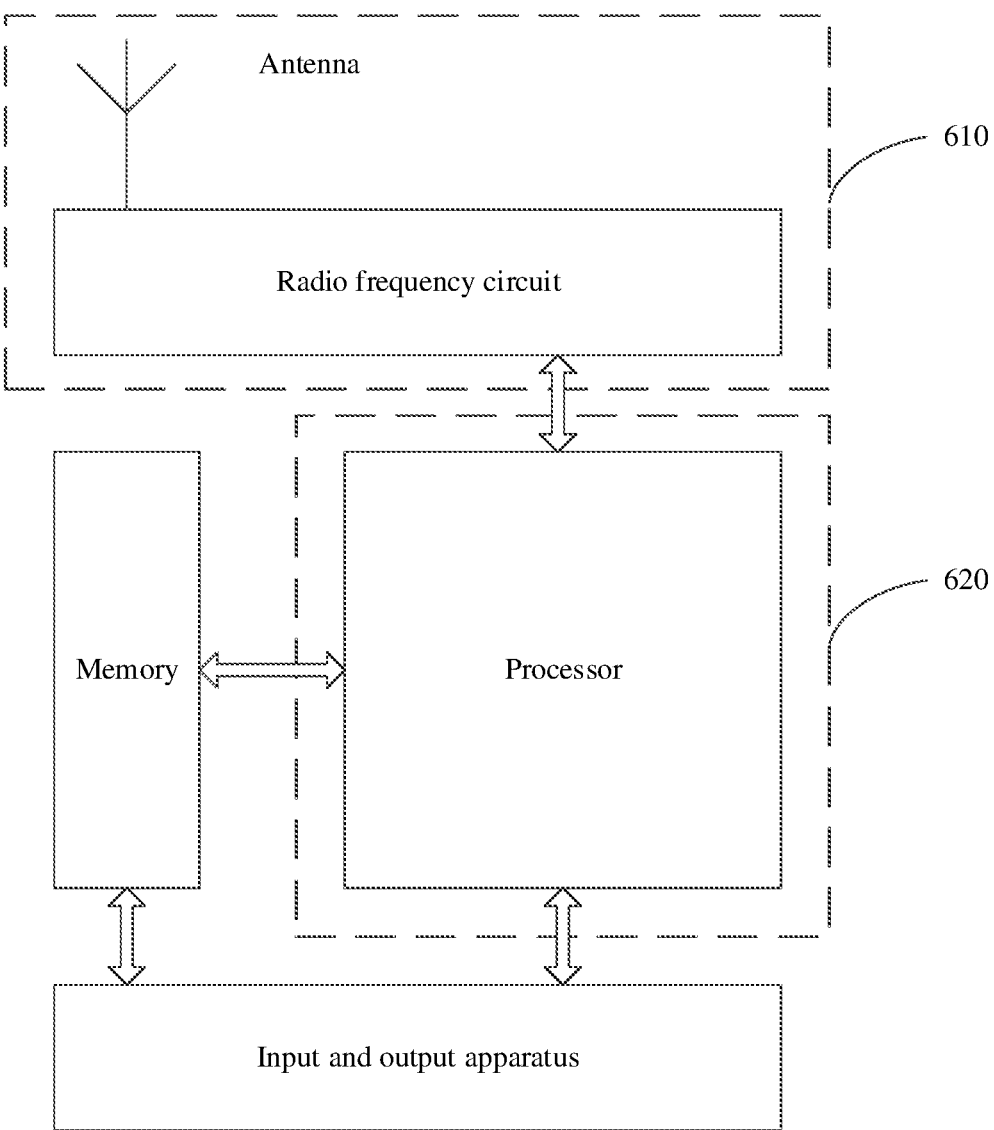
FIG. 6 is a schematic diagram of a structure of a communication apparatus according to at least one embodiment.

FIG. 6 is a schematic diagram of a structure of another communication apparatus. A terminal device provided in at least one embodiment includes the structure shown in FIG. 6, or a component in a terminal device provided in at least one embodiment includes the structure shown in FIG. 6. As shown in FIG. 6, the communication apparatus includes a structure such as a processor, a memory, a radio frequency unit, a radio frequency circuit, or an antenna. The processor is mainly configured to process a communication protocol and communication data, control the communication apparatus, execute a software program, process data of the software program, and the like. The memory is mainly configured to store the software program and the data. The radio frequency unit is mainly configured to perform conversion between a baseband signal to a radio frequency signal, and process the radio frequency signal.

As shown in FIG. 6, the communication apparatus includes a transceiver module 610 and a processing module 620. The transceiver module includes a sending module and a receiving module, or the transceiver module 610 is a module that implements sending and receiving functions. The transceiver module 610 corresponds to the transceiver module 520 in FIG. 5, that is, the transceiver module 610 implements the transceiver module 520. The processing module 620 corresponds to the processing module 510 in FIG. 5, that is, the processing module 620 performs the action performed by the processing module 510. The communication apparatus further includes a communication interface, configured to perform wired communication.

Optionally, the transceiver module 610 is also referred to as a transceiver, a transceiver circuit, a transceiver, or the like, and includes at least one antenna and a radio frequency unit. The transceiver module 610 is mainly configured to send and receive a radio frequency signal and convert a radio frequency signal and a baseband signal. The processing module 610 is mainly configured to perform baseband processing, control the terminal device, and the like. The transceiver module 610 and the processing module 620 is physically disposed together, or is physically separately disposed, that is, a distributed base station.

Figure 7:
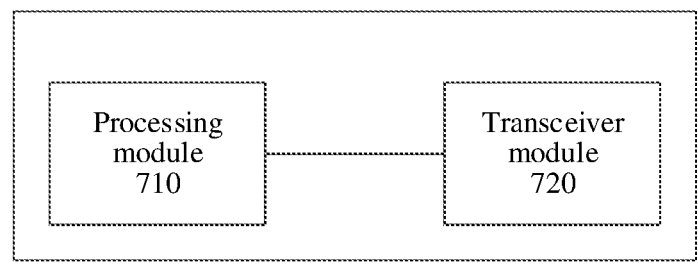
FIG. 7 is a schematic diagram of a structure of a communication apparatus according to at least one embodiment.

FIG. 7 is a schematic diagram of a structure of a communication apparatus according to at least one embodiment. The structure includes a processing module 710 and a transceiver module 720. For example, the structure is the shown core network device, or is a chip used in the core network device, or another combined device, component, or the like that has a function of the core network device shown in at least one embodiment. In response to the structure being the core network device, the transceiver module 720 is a communication interface or the like, the processing module 710 is a processor, and the processor includes one or more CPUs. In response to the structure being the component having the function of the core network device shown In at least one embodiment, the transceiver module 720 is a communication interface, and the processing module 710 is a CPU. In response to the structure being a chip system, the transceiver module 720 is an input/output interface of a chip, and the processing module 710 is a processor of the chip system, and includes one or more central processing units. In at least one embodiment, the processing module 710 is implemented as a processor or a processor-related circuit component, and the transceiver module 720 is implemented as a transceiver or a transceiver-related circuit component.

For example, the processing module 710 is configured to perform all operations, except sending and receiving operations, performed by the core network device in at least one embodiment, for example, generating a message, information, and/or signaling sent by the transceiver module 720 and/or processing a message, information, and/or signaling received by the transceiver module 720, and/or another process used to support the technology described in at least one embodiment. The transceiver module 720 is configured to perform all the sending and/or receiving operations performed by the core network device in at least one embodiment and/or the another process used to support the technology described in at least one embodiment.

Figure 8:
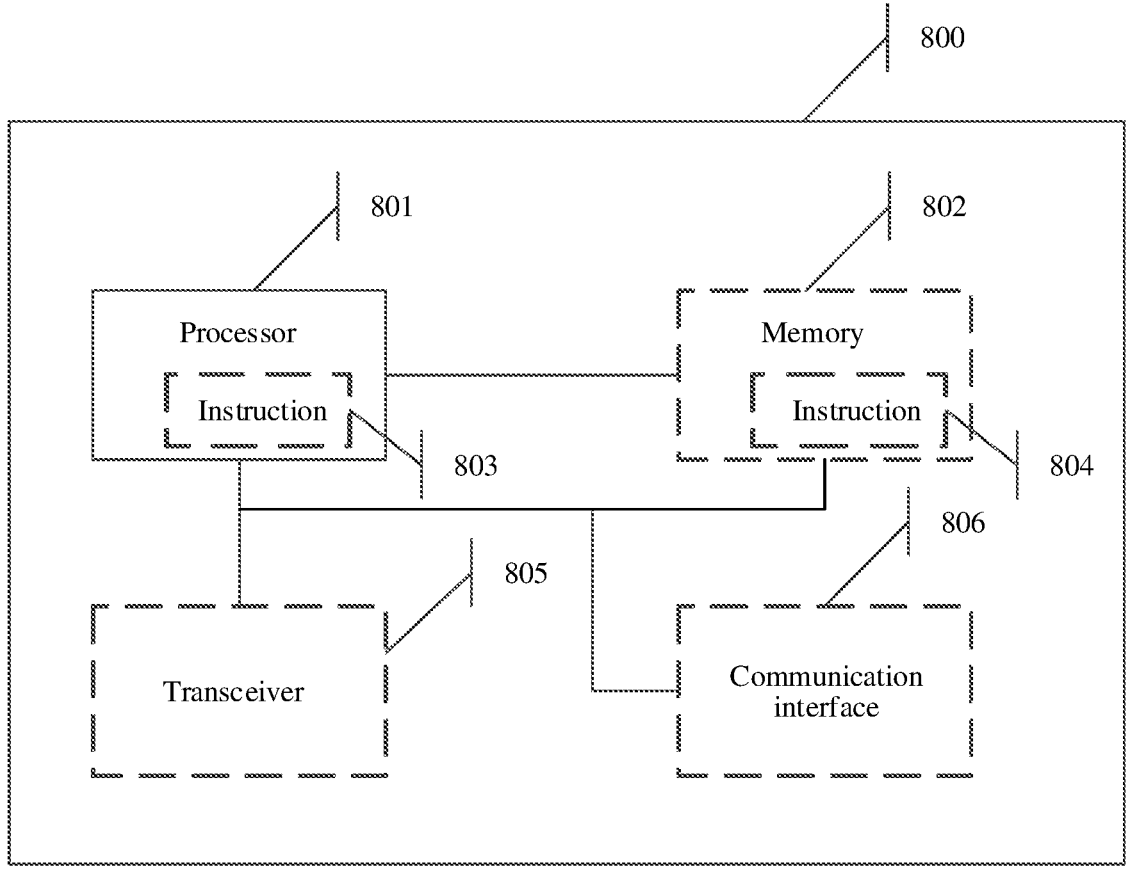
FIG. 8 is a schematic diagram of a structure of a communication apparatus according to at least one embodiment.

FIG. 8 is a schematic diagram of a structure of another communication apparatus according to at least one embodiment. The communication apparatus is implemented by a hardware component. The apparatus 800 shown in FIG. 8 is a core network device, or is a chip, a chip system, a processor, or the like that supports a core network device in implementing the foregoing method. The apparatus 800 includes a corresponding module, unit, or means (means) used by the core network device to perform steps described in at least one embodiment. The function, the unit, or the means is implemented by software, or is implemented by hardware, or is implemented by hardware executing corresponding software, or is implemented by combining software and hardware. For details, refer to corresponding descriptions in the following embodiments.

A hardware implementation is used as an example. The apparatus 800 includes one or more processors 801, and the processor 801 is also referred to as a processing unit, and implements a specific control function. The processor 801 is a general purpose processor, a dedicated processor, or the like. For example, the processor is a baseband processor or a central processing unit. The baseband processor is configured to process a communication protocol and communication data. The central processing unit is configured to execute a software program on the communication apparatus, and process data of the software program. The communication apparatus, for example, a base station, a baseband chip, a terminal, a terminal chip, a distributed unit, or a centralized unit, is controlled.

In an optional design, the processor 801 stores an instruction 803 and/or data, and the instruction 803 and/or the data is run by the processor, so that the apparatus 800 performs the method described in at least one embodiment.

In another optional design, the processor 801 includes a transceiver unit configured to implement receiving and sending functions. For example, the transceiver unit is a transceiver circuit, an interface, or an interface circuit. The transceiver circuit, the interface, or the interface circuit that is configured to implement the receiving and sending functions is separated, or is integrated together. The transceiver circuit, the interface, or the interface circuit is configured to read and write code/data, or the transceiver circuit, the interface, or the interface circuit is configured to transmit a signal.

In at least one embodiment, the apparatus 800 includes a circuit, and the circuit implements a sending function, a receiving function, or a communication function in at least one embodiment.

Optionally, the apparatus 800 includes one or more memories 802, where the memory stores an instruction 804, and the instruction is run on the processor, so that the apparatus 800 performs the method described in at least one embodiment. Optionally, the memory further stores data. Optionally, the processor also stores instructions and/or data. The processor and the memory is separately disposed, or is integrated together. For example, the correspondence described in at least one embodiment is stored in the memory or stored in the processor.

Optionally, the apparatus 800 further includes a transceiver 805 and/or a communication interface 806. The processor 801 is referred to as a processing unit, and controls the apparatus 800. The transceiver 805 is referred to as a transceiver unit, a transceiver, a transceiver circuit, a transceiver apparatus, a transceiver module, or the like, and is configured to implement a transceiver function. The communication interface 806 is, for example, a wireless transceiver, a transceiver circuit, an interface, or an interface circuit.

The processor 801 corresponds to the processing module 710 in FIG. 7, that is, the processor 801 implements the processing module 710. The transceiver 805 and/or the communication interface 806 corresponds to the transceiver module 720 in FIG. 7, that is, the transceiver 805 and/or the communication interface 806 implements the transceiver module 720.

Figure 9:
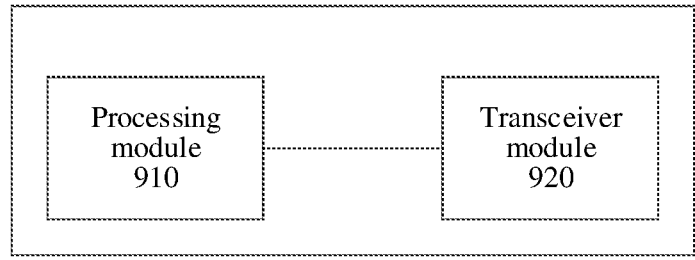
FIG. 9 is a schematic diagram of a structure of a communication apparatus according to at least one embodiment.

For example, FIG. 9 is a schematic diagram of another structure of a communication apparatus according to at least one embodiment. The structure includes a processing module 910 and a transceiver module 920. For example, the structure shown in FIG. 9 is an access network device, or is a chip used in an access network device, or another combined device, member, component, or the like that has a function of an access network device shown in at least one embodiment. In response to the structure being the access network device, the transceiver module 920 includes a transceiver and/or an interface. The transceiver includes an antenna, a radio frequency circuit, and the like. The communication interface, for example, an optical fiber interface, supports wired communication between the access network device and a core network device or another network node or device. The processing module 910 is a processor, for example, a baseband processor. The baseband processor includes one or more CPUs. In response to the structure being the component having the function of the access network device shown In at least one embodiment, the transceiver module 920 is a radio frequency unit or an interface, and the processing module 910 is a processor, for example, a baseband processor. In response to the structure being a chip system, the transceiver module 920 is an input/output interface of a chip, and the processing module 910 is a processor of the chip system, and includes one or more central processing units. In at least one embodiment, the processing module 910 is implemented as a processor or a processor-related circuit component, and the transceiver module 920 is implemented as a transceiver or a transceiver-related circuit component.

For example, the processing module 910 is configured to perform all operations, except sending and receiving operations, performed by the access network device in at least one embodiment, for example, a processing operation, and/or another process used to support the technology described in at least one embodiment, for example, generating a message, information, and/or signaling sent by the transceiver module 920, and processing a message, information, and/or signaling received by the transceiver module 920. The transceiver module 920 is configured to perform all the receiving and sending operations performed by the access network device in at least one embodiment and/or the another process used to support the technology described in at least one embodiment.

In addition, the transceiver module 920 is a functional module. The functional module completes both the sending operation and the receiving operation. For example, the transceiver module 920 is configured to perform all the sending operations and receiving operations performed by the access network device. For example, in response to performing the sending operation, the transceiver module 920 is considered as a sending module, and in response to performing the receiving operation, the transceiver module 920 is considered as a receiving module. Alternatively, the transceiver module 920 is two functional modules. The transceiver module 920 is considered as a collective name of the two functional modules. The two functional modules are respectively a sending module and a receiving module. The sending module is configured to complete the sending operation, for example, the sending module is configured to perform all the sending operations performed by the access network device. The receiving module is configured to complete the receiving operation, and the receiving module is configured to perform all the receiving operations performed by the access network device.

The communication apparatus shown in FIG. 9 is further configured to implement an OAM system or apparatus or device, an operator system or apparatus or device, or a content service provider system or apparatus or device.

Figure 10:
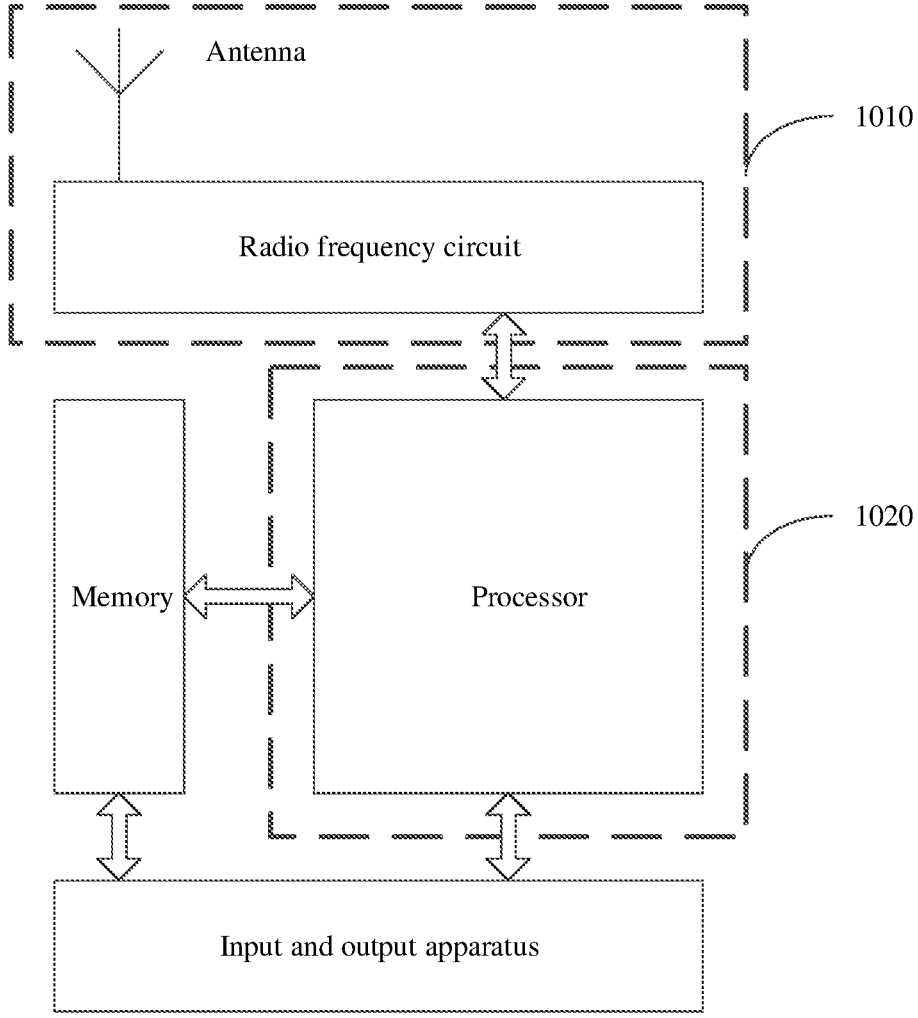
FIG. 10 is a schematic diagram of a structure of a communication apparatus according to at least one embodiment.

FIG. 10 is a schematic diagram of a structure of another communication apparatus. The communication apparatus is configured to implement an access network device or a component in an access network device. As shown in FIG. 10, the communication apparatus includes a structure such as a processor, a memory, a radio frequency unit, a radio frequency circuit, or an antenna. The processor is mainly configured to process a communication protocol and communication data, control the communication apparatus, execute a software program, process data of the software program, and the like. The memory is mainly configured to store the software program and the data. The radio frequency unit is mainly configured to perform conversion between a baseband signal to a radio frequency signal, and process the radio frequency signal.

As shown in FIG. 10, the communication apparatus includes a transceiver unit 1010 and a processing unit 1020. The transceiver module includes a sending module and a receiving module, or the processing unit 1010 is a module that implements sending and receiving functions. For example, the transceiver unit 1010 includes an antenna and/or a radio frequency circuit, and the processing unit 1020 includes a processor and/or a memory. The transceiver unit 1010 corresponds to the transceiver module 920 in FIG. 9, that is, the transceiver unit 1010 implements the transceiver module 920. The processing unit 1020 corresponds to the processing module 910 in FIG. 9, that is, the processing unit 1020 performs the action performed by the processing module 910. The access network device further includes a communication interface, configured to communicate with a core network device.

Optionally, the transceiver unit 1010 is also referred to as a transceiver, a transceiver circuit, a transceiver, or the like, and includes at least one antenna and a radio frequency unit. The transceiver unit 1010 is mainly configured to send and receive a radio frequency signal and convert a radio frequency signal and a baseband signal. The processing unit 1010 is mainly configured to perform baseband processing, control the access network device, and the like. The transceiver unit 1010 and the processing unit 1020 is physically disposed together, or is physically separately disposed, that is, a distributed base station.

For example, the transceiver unit 1010 includes one or more radio frequency units, for example, a remote radio unit (remote radio unit, RRU), and the processing unit 1020 includes one or more baseband units (baseband units, BBUs). The baseband unit is also referred to as a digital unit (digital unit, DU).

In an example, the processing unit 1020 includes one or more boards. The plurality of boards jointly supports a radio access network of a single access standard, for example, an LTE network, or separately supports radio access networks of different access standards, for example, an LTE network, a 5G network, or another network. The processing unit 1020 further includes a memory and a processor. The memory is configured to store instructions and data. The processor is configured to control the access network device to perform an action, for example, configured to control the access network device to perform an operation process of the access network device in embodiments shown In at least one embodiment. The memory and the processor serves one or more boards. That is, the memory and the processor is disposed individually on each board. Alternatively, a plurality of boards shares a same memory and a same processor. In addition, a circuit is further disposed on each board.

In addition, the structure shown in FIG. 10 is further configured to implement a terminal device or a component in a terminal device. For example, the processing unit 1020 is configured to perform all operations, except sending and receiving operations, performed by the terminal device in at least one embodiment, for example, a processing operation, and/or another process used to support the technology described in at least one embodiment, for example, generating a message, information, and/or signaling sent by the transceiver unit 1010, and processing a message, information, and/or signaling received by the transceiver unit 1010. The transceiver unit 1010 is configured to perform all the receiving and sending operations performed by the terminal device in at least one embodiment and/or the another process used to support the technology described in at least one embodiment.

The transceiver module 520 shown in FIG. 5 or the transceiver unit 610 shown in FIG. 6 performs the receiving action and/or the sending action performed by the terminal device in at least one embodiment. The processing module 510 shown in FIG. 5 or the processing unit 620 shown in FIG. 6 performs other actions than receiving and/or sending performed by the terminal device in at least one embodiment. In addition, the transceiver module 720 shown in FIG. 7 or the transceiver 805 and/or the communication interface 806 shown in FIG. 8 performs the receiving action and/or the sending action performed by the core network device or the OAM, the operator, or the content service provider in at least one embodiment. The processing module 710 shown in FIG. 7 or the processor 801 shown in FIG. 8 performs other actions than receiving and/or sending performed by the core network device or the OAM, the operator, or the content service provider in at least one embodiment. In addition, the transceiver module 920 shown in FIG. 9 or the transceiver unit 1010 shown in FIG. 10 performs the receiving action and/or the sending action performed by the access network device in at least one embodiment. The processing module 910 shown in FIG. 9 or the processing unit 1020 shown in FIG. 10 performs other actions than receiving and/or sending performed by the access network device in at least one embodiment.

Figure 11:
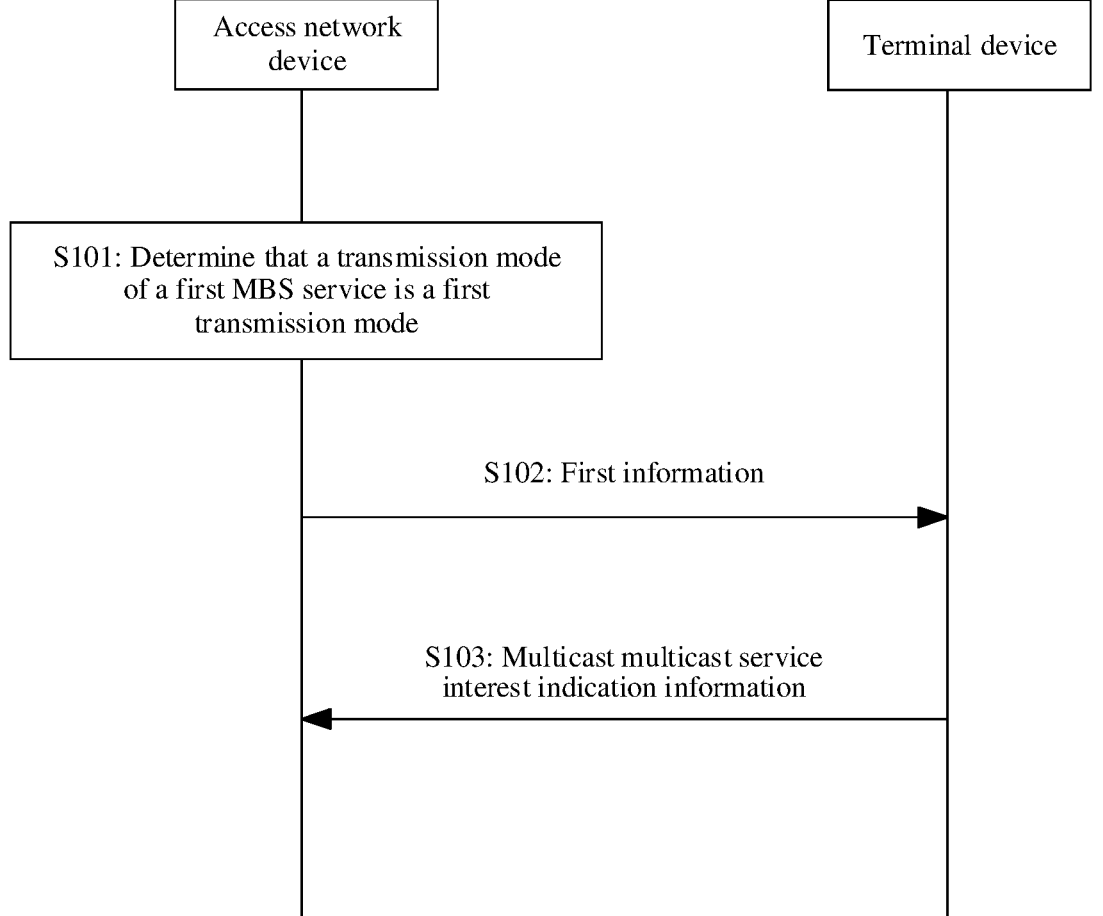
FIG. 11 is a schematic flowchart of a communication method according to at least one embodiment.

As shown in FIG. 11, a communication method provided in at least one embodiment includes the following steps.

S101: An access network device determines that a transmission mode of a first MBS service is a first transmission mode, where the first transmission mode is a transmission mode in which an MBS service is received in any one of a connected state, an inactive state, or an idle state.

In at least one embodiment, the connected state includes an RRC connected state. The inactive state includes an RRC inactive state. The idle state includes an RRC idle state.

In at least one embodiment, receiving an MBS service includes receiving configuration information and/or service data of the MBS service. That is, in the first transmission mode, the terminal device is able to not receive the configuration information and/or the service data of the MBS service in the RRC connected state. In other words, the terminal device receives, in the RRC connected state, the RRC inactive state, or the RRC idle state, the configuration information and/or the service data of the MBS service whose transmission mode is the first transmission mode.

S102: The access network device sends first information to a terminal device. The first information is used to request MBS service interest indication information.

The MBS service interest indication information indicates whether the terminal device is interested in the first MBS service, and/or indicate whether the terminal device is receiving the first MBS service. In other words, the MBS service interest indication information indicates whether the terminal device expects to receive the first MBS service.

Optionally, the first information is used to request the MBS service interest indication information of the first MBS service in a manner of indicating that the first MBS service is a service transmitted in the first transmission mode. The terminal device determines that the transmission mode of the first MBS service is the first transmission mode based on the first information. For the first MBS service in the first transmission mode, in response to the terminal device being interested in the first MBS service and/or is receiving the first MBS service, the terminal device reports the MBS service interest indication information.

The first information includes an identifier of the first MBS service. For example, the information includes a temporary mobile group identity (temporary mobile group identity, TMGI) or an MBS service identity (MBS service ID) of the first MBS service, or a radio network temporary identifier used to schedule the first MBS service, for example, a group mobile subscriber identification identifier (group radio network temporary identifier, G-RNTI), an MBS session identifier (MBS session ID) used to transmit the first MBS service, or a protocol data unit (protocol data unit, PDU) session identifier (PDU session ID) used to transmit the first MBS service.

Optionally, a sending occasion of the first information is determined by the access network device. For example, the access network device determines the sending occasion of the first information based on load of the access network device.

For example, the access network device periodically sends the first information. Alternatively, the access network device sends the first information before starting transmission of the first MBS service and/or before transmission of the first MBS service is about to end, or before the first MBS service is about to be closed, to request to obtain the MBS service interest indication information of the terminal device for the first MBS service. In at least one embodiment, starting transmission of the MBS service means that the access network device completes configuration of an MBS service of UE, and starts to transmit data of the MBS service. Ending transmission of the MBS service means that a configuration and/or data of the MBS service that is to be transmitted by the access network device is transmitted, that is, transmission of the MBS service ends. Closing the MBS service means that the access network device stops transmitting a configuration and/or data of the MBS service. In this scenario, the MBS service is still running, but the access network device no longer performs data transmission on the MBS service. Closing the MBS service also means that the access network device does not perform data transmission on the MBS service in a cell managed by the access network device.

In at least one embodiment, in response to load of the access network device being high, the access network device sends the first information to learn of MBS service interest indication information of a terminal device managed by the access network device or a terminal device located within signal coverage of the access network device for the first MBS service. The first information is sent in a manner of unicast, multicast, multicast, or in another manner. In response to no terminal device being interested in the first MBS service and no terminal device is receiving the first MBS service, or in response to a small quantity of terminal devices being interested in the first MBS service and receiving the first MBS service, the access network device closes the first MBS service, to reduce the load.

Optionally, the first information is carried in a multicast control channel message or system information (system information, SI). In response to the first information being carried in the MCCH message, only a terminal device that receives an MBS service and/or is interested in an MBS service receives the information. Therefore, another terminal device is prevented from responding to the first information. In response to the first information being carried in the SI, the SI is multicast-related SI.

Optionally, the access network device implicitly requests the terminal device to report an interest for the first MBS service, for example, include information such as an identifier of the first MBS service in the first information, to request to obtain the MBS service interest indication information of the terminal device for the first MBS service. In this case, the SI as the first information carries the identifier of the first MBS service, for example, carry a list of identifiers of the first MBS service. For another example, in response to SI starting to be broadcast in a cell, the terminal device reports MBS service interest indication information, and the terminal device reads the SI. The SI carries the information such as the identifier of the first MBS service, to request to obtain the MBS service interest indication information of the terminal device for the first MBS service.

Correspondingly, the terminal device receives the first information.

S103: The terminal device sends MBS service interest indication information to the access network device based on the first information.

The terminal device receives the first information, and sends the MBS service interest indication information of the terminal device for the first MBS service to the access network device.

Optionally, in response to the terminal device determining that the terminal device is interested in the first MBS service indicated by the first information and/or is receiving data of the first MBS service, the terminal device sends the MBS service interest indication information to the access network device. In this case, the MBS service interest indication information indicates that the terminal device is interested in the first MBS service and/or indicate that the terminal device is receiving the data of the first MBS service. Alternatively, in response to the terminal device not being interested in the first MBS service and/or does not receive data of the first MBS service, the terminal device sends the MBS service interest indication information to the access network device. The MBS service interest indication information indicates that the terminal device is not interested in the first MBS service and/or indicate that the terminal device is not receiving the data of the first MBS service. Alternatively, in response to the terminal device not being interested in the first MBS service and/or does not receive data of the first MBS service, the terminal device does not send the MBS service interest indication information to the access network device.

Optionally, in response to the terminal device being in the RRC connected state, the terminal device sends the MBS service interest indication information in the RRC connected state. In addition, in response to the terminal device being in the RRC idle state or the RRC inactive state, the terminal device initiates RA, and send the MBS service interest indication information after entering the RRC connected state. Alternatively, the terminal device sends the MBS service interest indication information in RA by using signaling in the RA process. The signaling in the RA process is, for example, a message (msg) 1 message, a msg 3 message, a msg 5 message in the four-step RA process, or a msg A in the two-step RA process.

Optionally, after receiving the first information, the terminal device sends the MBS service interest indication information in response to the following condition being met: A connection between the terminal device and the access network device is successfully established, a session of an MBS service of interest is started or stopped, an MBS service of interest is changed, an MBS interest (MBS interest) is changed, a priority of receiving an MBS service and a unicast service is changed, a new cell is camped on/switched to/selected, an MBS service of interest reporting request or an MBS interest reporting request is received from the access network device, or the like. After receiving the first information, the terminal device alternatively periodically reports the MBS service interest indication information. The MBS service herein includes, but not limited to, the first MBS service.

The terminal device sends the MBS service interest indication information in the RRC connected state or in a process of entering the RRC connected state. However, a state in which the terminal device receives the first MBS service is not limited in at least one embodiment. That is, the terminal device receives configuration information and/or data of the first MBS service in any one of the RRC connected state, the RRC inactive state, or the RRC idle state.

Correspondingly, the access network device receives the MBS service interest indication information.

Optionally, the MBS service interest indication information includes information about the terminal device that sends the MBS service interest indication information, or the MBS service interest indication information is sent together with information about the terminal device, or the access network device obtains, based on the received MBS service interest indication information, information about the terminal device that sends the MBS service interest indication information. The information about the terminal device is, for example, a terminal device identifier. Therefore, the access network device is informed of the information about the terminal device that is interested in the first MBS service and/or is receiving the first MBS service. The access network device determines, based on the information about the terminal device that is interested in the first MBS service, a quantity of terminal devices that receive/are interested in the first MBS service in the cell and information about each terminal device, so that the access network device schedules MBS service data more efficiently and energy-savingly. In addition, continuity of the first MBS service is ensured based on the information about the terminal device that is interested in the first MBS service and/or is receiving the first MBS service. For example, in response to the terminal device being handed over between cells, transmission continuity of the first MBS service before and after the handover is maintained. In addition, the access network device closes or end the first MBS service in response to a quantity of terminal devices that are interested in the first MBS service and/or are receiving the first MBS service being small, so that the terminal device that is interested in the first MBS service is handed over to another neighboring cell to continue to receive the service, to achieve an effect of energy saving and resource saving. The transmission mode of the first MBS service herein is the first transmission mode.

By using the foregoing method, the terminal device reports the broadcast multicast service interest indication information of the first MBS service to the access network device, where the transmission mode of the first MBS service is the first transmission mode. Therefore, the terminal device no longer reports information indicating whether the terminal device is interested in another MBS service and information indicating whether the terminal device is receiving another MBS service, thereby reducing uplink overheads.

In an implementation of S101, the access network device receives second information, and determine that the transmission mode of the first MBS service is the first transmission mode based on the second information. The second information indicates the transmission mode of the first MBS service, or the second information indicates that the transmission mode of the first MBS service is the first transmission mode. Therefore, the access network device learns that the transmission mode of the first MBS service is the first transmission mode.

Optionally, the transmission mode of the first MBS service is determined by an operation and administration maintenance (operation and maintenance, OAM), a core network device, an operator, a content service provider, or the like. In other words, the second information is determined by the OAM, the core network device, the operator, the content service provider, or the like. The content service provider is, for example, an application provider or a service provider.

Optionally, the second information explicitly indicates that the transmission mode of the first MBS service is the first transmission mode, for example, carry information explicitly indicating that the transmission mode of the first MBS service is the first transmission mode.

Alternatively, the second information implicitly indicates the transmission mode of the first MBS service. For example, the second information includes related information of the first MBS service, for example, a quality of service (quality of service, QoS)-related configuration file (profile), and a transmission requirement of an upper-layer system such as the operator and/or the content service provider for the first MBS. In response to the related information of the first MBS service including specific information, the transmission mode of the first MBS service is the first transmission mode; or in response to the related information of the first MBS service including specific information, the transmission mode of the first MBS service is a second transmission mode. Conversely, in response to the related information of the first MBS service not including the specific information, the transmission mode of the first MBS service is the second transmission mode; or in response to the related information of the first MBS service not including the specific information, that the transmission mode of the first MBS service is the first transmission mode. In at least one embodiment, in response to the related information of the first MBS service not including the information about the terminal device that is interested in the first MBS service and/or is receiving the first MB S service, where the information about the terminal device is, for example, a terminal identifier (UE ID), the access network device determines that the transmission mode of the first MBS service is the first transmission mode; and in response to the related information of the first MB S service including the information about the terminal device that is interested in the first MBS service and/or is receiving the first MBS service, the access network device determines that the transmission mode of the first MBS service is the second transmission mode. The QoS-related configuration file includes at least one of parameters such as a 5G quality identity (5G quality identity, 5QI) of the first MBS service, an allocation retention priority (allocation retention priority, ARP), a packet error rate (packet error rate), a data delay budget (Packet Delay Budget), types of services (types of services), and a guaranteed bit rate (guaranteed bit rate, GBR) or a non-guaranteed bit rate (non-GBR). In response to a transmission mode of an MB S service being determined by the operator and/or the content service provider, a configuration result of the transmission mode of the MBS service is indicated to the core network device and/or the access network device through the OAM. For example, the operator and/or the content service provider indicates that the transmission mode of the MBS service is the first transmission mode or the second transmission mode to the core network device and/or the access network device through the OAM. In other words, the transmission mode of the MBS service is determined by the OAM. In other words, the OAM or the server determines a transmission requirement of the MBS service and the like. The transmission requirement of the MBS service is used to determine the transmission mode of the MBS service. For example, in response to the MBS service meeting a parameter requirement of the first transmission mode, the MBS service is determined to be in the first transmission mode. A function of the OAM is implemented by a system, an apparatus, a device, or the like.

Optionally, the OAM sends second information to the core network device and/or the access network device. For example, the second information indicates that the first MBS service is in the first transmission mode, or the second information indicates that the first MBS service is not in the second transmission mode or another transmission mode. The core network device sends the second information to the access network device based on the foregoing information obtained from the OAM.

Optionally, the second information is at a core network device level (configured for a CN), that is, the configuration is read by the core network device, or the second information is configured for the core network device. For example, the OAM sends, to the core network device, information indicating the transmission mode of the first MBS service. After performing interpretation, the core network device sends the second information including the related information to the access network device. The access network device determines the transmission mode of the first MBS service.

Optionally, the second information is at an access network device level (configured for a gNB), that is, the configuration is read by the access network device, or the second information is configured for the access network device. For example, the OAM sends, to the core network, information indicating the transmission mode of the first MBS service, and the core network sends the information to the access network device. The access network device interprets the information and determines the transmission mode of the first MBS service.

Optionally, in response to the OAM, the operator, and/or the content service provider sending the second information to the access network device, the access network device further sends the second information to the core network device, or send, to the core network device, information indicating that the transmission mode of the first MBS service is the first transmission mode.

Optionally, the second information further indicates an MBS service whose transmission mode is the second transmission mode.

Optionally, the second information explicitly indicates that the transmission mode of the first MBS service is the first transmission mode. For example, the first information carries information such as an identifier of an MBS service, and/or carries indication information indicating that a transmission mode of the MBS service is the first transmission mode and/or the second transmission mode. For example, the indication information is a bit map (bit map) associated with a set or configured MBS service list. A transmission mode of an MBS service that is in the MBS service list and that corresponds to a bit whose value is 0 is the first transmission mode or the second transmission mode, and a transmission mode of an MBS service that is in the MBS service list and that corresponds to a bit whose value is 1 is the second transmission mode or the first transmission mode.

Alternatively, an implicit indication manner is used to indicate that the transmission mode of the first MBS service is the first transmission mode. For example, in response to information such as identifiers of terminal devices being carried, transmission modes of MBS services of the terminal devices are the first transmission mode, or transmission modes of MBS services of the terminal devices are the second transmission mode. Subsequently, the access network device notifies, based on the identifier of the terminal device, the terminal device to receive, in the connected state, the MBS service whose transmission mode is the second transmission mode. In addition, the transmission mode of the MBS service alternatively is indicated by using an explicit indication in combination with an implicit indication.

For example, the foregoing process in which the OAM or the operator or the content service provider notifies the access network device or the core network device of the transmission mode of the first MBS service is described by using steps shown in FIG. 12. The process is implemented independently of the process shown in FIG. 11, or the process shown in FIG. 12 is used as a part of the steps shown in FIG. 11, for example, as one of the implementations of S101.

As shown in FIG. 12, the process includes the following steps.

S201: An OAM, an operator, or a content service provider determines that a transmission mode of a first MBS service is a first transmission mode or a second transmission mode.

The OAM, the operator, or the content service provider determines the transmission mode of the first MBS service based on at least one of a QoS related requirement of the first MBS service, an operator policy, a requirement of the content service provider, or the like.

S202: The OAM, the operator, or the content service provider sends indication information of the transmission mode of the first MBS service.

The indication information indicates that the transmission mode of the first MBS service is the first transmission mode or the second transmission mode. The indication information explicitly and/or implicitly indicates that the transmission mode of the first MBS service is the first transmission mode or the second transmission mode. For the explicit and/or implicit indication manner, refer to the foregoing description. The explicit indication is, for example, carrying information, a bit map, or the like indicating that the transmission mode of the first MBS service is the first transmission mode or the second transmission mode in the indication information. The implicit indication is that, for example, in response to the indication information carrying information such as an identifier of a terminal device, the transmission mode of the MBS service is the first transmission mode or the second transmission mode.

In S202, the indication information is sent to the core network device or the access network device for receiving.

In response to the core network device receiving the indication information, the indication information is determined by the OAM, the operator, or the content service provider. In this case, configuration for the core network (configured for a CN) is implemented. The configuration for the core network means that configuration of the transmission mode of the first MBS service by the OAM, the operator, or the content service provider is at a CN level, or is visible to the core network device and interpreted by the core network device. In this case, the core network device sends the indication information of the transmission mode of the first MBS service to the access network device, to notify the access network device of the transmission mode of the first MBS service. A manner in which the core network device sends the indication information to the access network device is an explicit indication, an implicit indication, or a combination of an explicit indication and an implicit indication.

In response to the access network device receiving the indication information, the access network device is informed of the transmission mode of the first MBS service. The indication information is forwarded or sent by the core network device to the access network device.

In response to the access network device receiving the indication information, the indication information is determined by the OAM, the operator, the content service provider, or the core network device. In this case, configuration for the access network device (configured for a gNB) is implemented. The configuration for the access network device means that configuration of the transmission mode of the first MBS service by the OAM, the operator, the content service provider, or the core network device is configuration at an access network device level, or is visible to the access network device and interpreted by the access network device. In this case, optionally, the access network device sends the indication information of the transmission mode of the first MBS service to the core network device, to notify the core network device of the transmission mode of the first MBS service. A manner in which the access network device sends the indication information to the core network device is an explicit indication, an implicit indication, or a combination of an explicit indication and an implicit indication. The explicit indication is, for example, carrying information, a bit map, or the like indicating that the transmission mode of the first MBS service is the first transmission mode or the second transmission mode in the indication information. The implicit indication is that, for example, in response to the indication information carrying information such as an identifier of a terminal device, the transmission mode of the MBS service is the first transmission mode or the second transmission mode.

In the foregoing process, the operator configures a transmission mode of an MBS service and indicate the transmission mode of the MBS service to the access network device, and the access network device learns whether the transmission mode of the MBS service is the first transmission mode or the second transmission mode.

In another implementation of S101, the core network device and/or the access network device obtains a first condition, and determine whether an MBS service is the first MBS service based on the first condition. Obtaining the first condition herein is that the core network device and/or the access network device receives the first condition from the OAM, the operator, the content service provider, or another node, or obtains the first condition locally. In response to the core network device and/or the access network device locally obtaining the first condition, the first condition is determined by the core network device and/or the access network device, or the first condition is stored in the core network device and/or the access network device.

In response to the core network device determining whether the MBS service is the first MBS service, in S101, the core network device indicates a determining result to the access network device. In response to the access network device determining whether the MBS service is the first MBS service, in S101, the access network device determines whether the MBS service meets the first condition. In response to the MBS service meeting the first condition, the MBS service is the first MBS service.

Optionally, the core network device and/or the access network device receives configuration information of the content service provider, the operator, or the OAM, where the configuration information is used to configure the core network device and/or the access network device to obtain the first condition and determine the transmission mode of the MBS service based on the first condition. The transmission mode is the first transmission mode or the second transmission mode. The MBS service that meets the first condition is the first MBS service, or the transmission mode of the MBS service that meets the first condition is the first transmission mode. Conversely, the transmission mode of the MBS service that does not meet the first condition is the second transmission mode or another transmission mode.

The first condition is a transmission parameter condition. In response to a transmission parameter and/or a transmission requirement of the first MBS service meeting the transmission parameter condition, the transmission mode of the first MBS service is determined to be the first transmission mode. Optionally, in response to the first condition not being met, the transmission mode of the first MBS service is determined to be the second transmission mode.

For example, the transmission parameter condition is that, for example, a QoS level of the first MBS service is not higher than a threshold. Therefore, in response to determining that the QoS level of the first MBS service is not higher than the threshold, the access network device determines that the transmission mode of the first MBS service is the first transmission mode. The QoS level of the first MBS service is preconfigured or configured by the access network device and/or the core network device. The QoS level is indicated by at least one parameter of an ARP, a packet error rate, a packet delay budget, types of services, or a GBR/a non-GBR, or the QoS level includes at least one parameter of an ARP, a packet error rate, a packet delay budget, types of services, or a GBR/a non-GBR. The threshold is a set value corresponding to the QoS level or a value specified by the OAM, the operator, the content service provider, or the core network device. For example, in response to the QoS level being indicated by using the packet error rate, the threshold is a set value of the packet error rate.

In addition, the first condition further includes an 5QI of an MBS service in the first transmission mode and/or the second transmission mode. In response to a 5QI of the first MBS service being one of 5Qis of MBS services that are in the first transmission mode that are indicated by the first condition, the first MBS service is an MBS service in the first transmission mode. Otherwise, in response to the 5QI of the first MBS service not belonging to one of the 5Qis of the MBS services that are in the first transmission mode and that are indicated by the first condition, the first MBS service is an MBS service in the second transmission mode.

In response to the core network device determining the transmission mode of the first MBS service based on the first condition, the first condition is determined by the OAM, the operator, the content service provider, or the like, and sent to the core network device. In addition, the first condition alternatively is determined by the core network device and/or stored in the core network device.

In addition, in response to the core network device determining the transmission mode of the first MB S service based on the first condition, in an implementation of S101, the core network device sends, to the access network device, second information indicating that the transmission mode of the first MBS service is the first transmission mode. The access network device learns that the transmission mode of the first MBS service is the first transmission mode based on the second information. Before sending the second information, the core network device determines whether the first MBS service meets the first condition. In response to the first MBS service meeting the first condition, the transmission mode of the first MBS service is the first transmission mode.

In response to the access network device determining the transmission mode of the first MBS service based on the first condition, the first condition is determined by the OAM, the core network device, the operator, the content service provider, or the like. In addition, the first condition alternatively is determined by the access network device and/or stored in the access network device.

In addition, in response to the access network device determining the transmission mode of the first MBS service based on the first condition, in S101, the access network device obtains third information, where the third information indicates the first condition, and determine whether the first MBS service meets the first condition. In response to the first MBS service meeting the first condition, the transmission mode of the first MBS service is the first transmission mode.

Optionally, in response to the access network device determining the transmission mode of the first MBS service based on the first condition, the access network device further sends fourth information to the core network device, where the fourth information indicates that the transmission mode of the first MBS service is the first transmission mode, so that the core network device learns of the transmission mode of the first MBS service. The transmission mode of the first MBS service is the first transmission mode or the second transmission mode.

For example, the foregoing process in which the access network device determines the transmission mode of the first MBS service based on the first condition is described by using steps shown in FIG. 13. The process is implemented independently of the process shown in FIG. 11, or a part or all of the process shown in FIG. 13 is used as a part of the steps shown in FIG. 11, for example, as one implementation of S101. The process includes the following steps.

S301: An access network device obtains a first condition.

The first condition is obtained from an OAM, an operator, a content service provider, or a core network device. Alternatively, the first condition is determined by the access network device or stored in the access network device.

The first condition is, for example, a QoS condition, or the first condition includes a 5QI of an MBS service in a first transmission mode and/or a second transmission mode.

Optionally, in S301, the access network device receives the first condition from the OAM, the operator, the content service provider, or the core network device. The first condition is determined by the OAM, the operator, the content service provider, or the core network device.

Optionally, the first condition is determined by the access network device and/or stored in the access network device.

S302: The access network device determines whether a first MBS service meets the first condition. An MBS service that meets the first condition is the first MBS service. In other words, a transmission mode of the MBS service that meets the first condition is the first transmission mode.

In the foregoing process, the access network device determines the transmission mode of the MBS service. Therefore, the access network device learns whether the transmission mode of the first MBS service is the first transmission mode or the second transmission mode. S102 and S103 is subsequently performed.

Optionally, after S302, the access network device sends fourth information to the core network device, where the fourth information indicates the transmission mode of the first MBS service.

Figure 14:
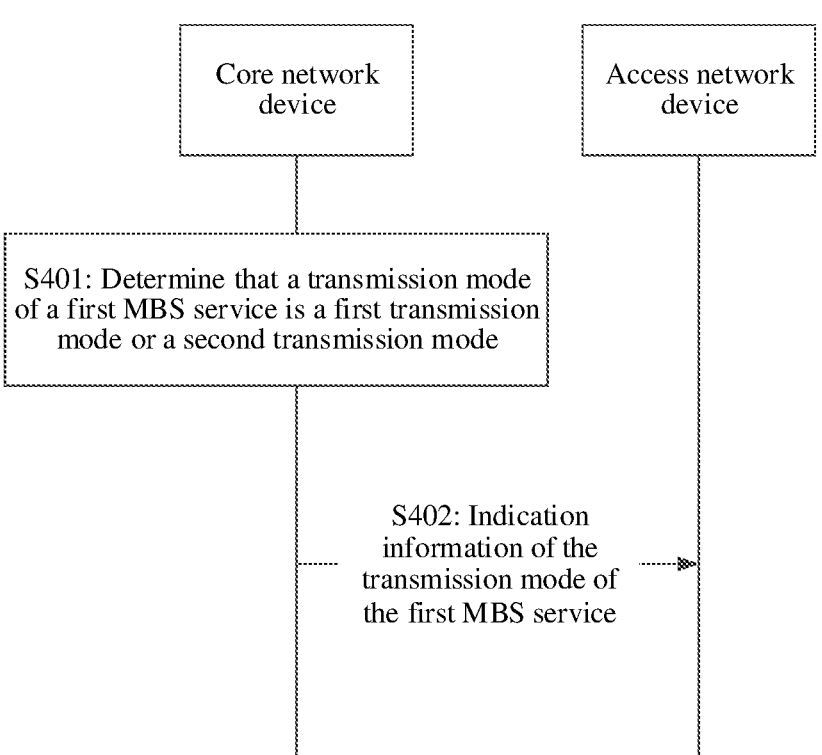
FIG. 14 is a schematic flowchart of another communication method according to at least one embodiment.

For example, a process in which the core network device determines the transmission mode of the first MBS service and indicates the transmission mode of the first MBS service to the access network device in at least one embodiment is described by using steps shown in FIG. 14. The process is implemented independently of the process shown in FIG. 11, or a part or all of the process shown in FIG. 14 is used as a part of the steps shown in FIG. 11, for example, as one implementation of S101. As shown in FIG. 14, the process includes the following steps.

S401: A core network device determines that a transmission mode of a first MBS service is a first transmission mode or a second transmission mode.

For example, the transmission mode of the first MBS service is configured by the core network device. Based on the configuration, the core network device stores indication information of the transmission mode of the first MBS service, where the indication information indicates that the transmission mode of the first MBS service is the first transmission mode or the second transmission mode. The indication information is configured by an OAM, an operator, a content service provider, or the core network device.

Alternatively, the core network device receives fifth information, where the fifth information is, for example, the indication information of the transmission mode of the first MBS service. The core network device determines the transmission mode of the first MBS service based on the fifth information. The fifth information is from the OAM, the operator, the content service provider, or the core network device.

Alternatively, the core network device determines that the transmission mode of the first MBS service is the first transmission mode or the second transmission mode. For example, the core network device determines whether a QoS level of the first MBS service meets a first condition, and determines that the transmission mode of the first MBS service is the first transmission mode in response to the QoS level of the first MBS service meeting the first condition. In response to the first MBS service not meeting the first condition, is determined that the transmission mode of the first MBS service is determined to be the second transmission mode or another transmission mode. The MBS service that meets the first condition is the first MBS service, or the transmission mode of the MBS service that meets the first condition is the first transmission mode.

The first condition is, for example, a QoS condition, or the first condition includes a 5QI of an MBS service in a first transmission mode and/or a second transmission mode.

For a configuration manner of the first condition, refer to the foregoing description. For example, the first condition is configured by the OAM, the operator, or the content service provider.

S402: The core network device sends indication information of the transmission mode of the first MBS service to an access network device.

The indication information indicates that the transmission mode of the first MBS service is the first transmission mode, the second transmission mode, or another transmission mode. For example, in response to the transmission mode of the first MBS service being the first transmission mode, the core network device sends information indicating that the transmission mode of the first MBS service is the first transmission mode. In response to the transmission mode of the first MBS service being the second transmission mode, the core network device sends information indicating that the transmission mode of the first MBS service is the second transmission mode.

Correspondingly, the access network device receives the indication information of the transmission mode of the first MBS service. The access network device is informed of the transmission mode of the first MBS service.

In the foregoing process, the core network device determines a transmission mode of an MBS service and indicate the transmission mode of the MBS service to the access network device, and the access network device learns whether the transmission mode of the MBS service is the first transmission mode or the second transmission mode. S102 and S103 is subsequently performed.

For example, in S402 and/or S502, the indication information of the transmission mode of the first MBS service explicitly indicates that the transmission mode of the first MBS service is the first transmission mode or the second transmission mode. For example, the indication information includes a bit map associated with a list of MBS services that the terminal device is interested in or a set or configured list of MBS services.

Alternatively, the indication information implicitly indicates that the transmission mode of the MBS service is the first transmission mode or the second transmission mode. In response to the transmission mode of the MBS service being implicitly indicated, the indication information includes information indicating that the terminal device is allowed to return to or enter the RRC idle state or the RRC inactive state after registration; or information such as request information used to determine that the terminal device reports MBS service interest indication information for the MBS service. Therefore, after receiving the indication information, the terminal device returns to or enter the RRC idle state or the RRC inactive state based on an indication of the network device or a decision of the terminal device, and/or report the MB S service interest indication information for the MBS service after receiving the indication information.

The indication information includes information such as an identifier of the first MBS service, a radio network temporary identifier used to schedule the first MBS service, an MBS session identifier used to transmit a multicast service, or a protocol data unit session identifier used to transmit a multicast service.

Figure 15:
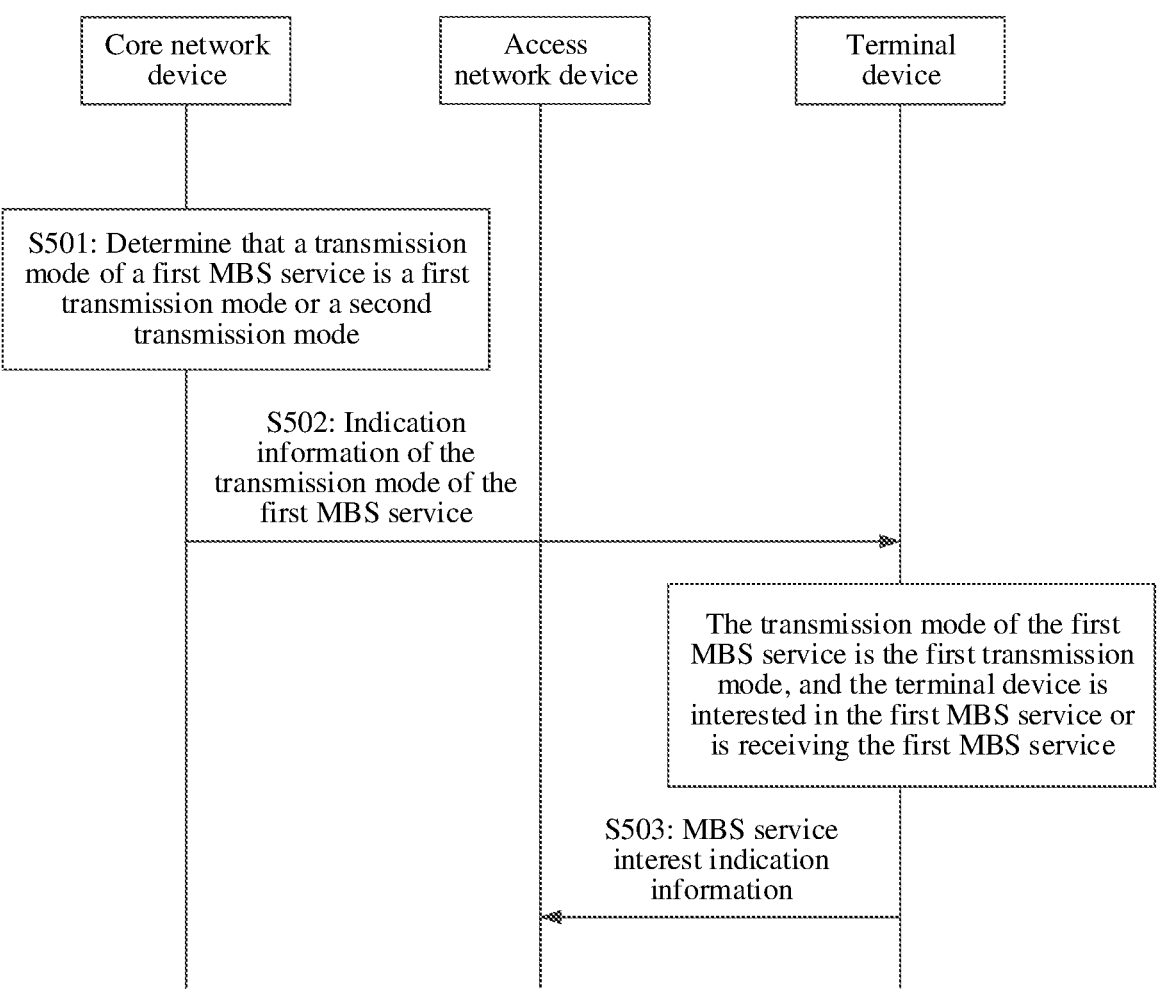
FIG. 15 is a schematic flowchart of another communication method according to at least one embodiment.

As shown in FIG. 15, in response to the core network device determining the transmission mode of the first MBS service, the core network device further indicates the transmission mode of the first MBS service to the terminal device, and the terminal device reports MBS service interest indication information to the access network device. The process is implemented independently of the process shown in FIG. 11. As shown in FIG. 15, the process includes the following steps.

S501: A core network device determines that a transmission mode of a first MBS service is a first transmission mode or a second transmission mode.

For an implementation of S501, refer to S401.

S502: The core network device sends indication information of the transmission mode of the first MBS service to a terminal device.

For an implementation of S502, refer to S402.

S503: The terminal device sends MBS service interest indication information to an access network device in response to the transmission mode of the first MBS service being the first transmission mode, and the terminal device is interested in the first MBS service and/or is receiving the first MBS service.

The MBS service interest indication information indicates that the terminal device is interested in the first MB S service and/or is receiving the first MB S service.

In the foregoing process, the core network device determines a transmission mode of an MBS service and indicate the transmission mode of the MBS service to the terminal device, and the terminal device reports MBS service interest indication information to the access network device.

Figure 16:
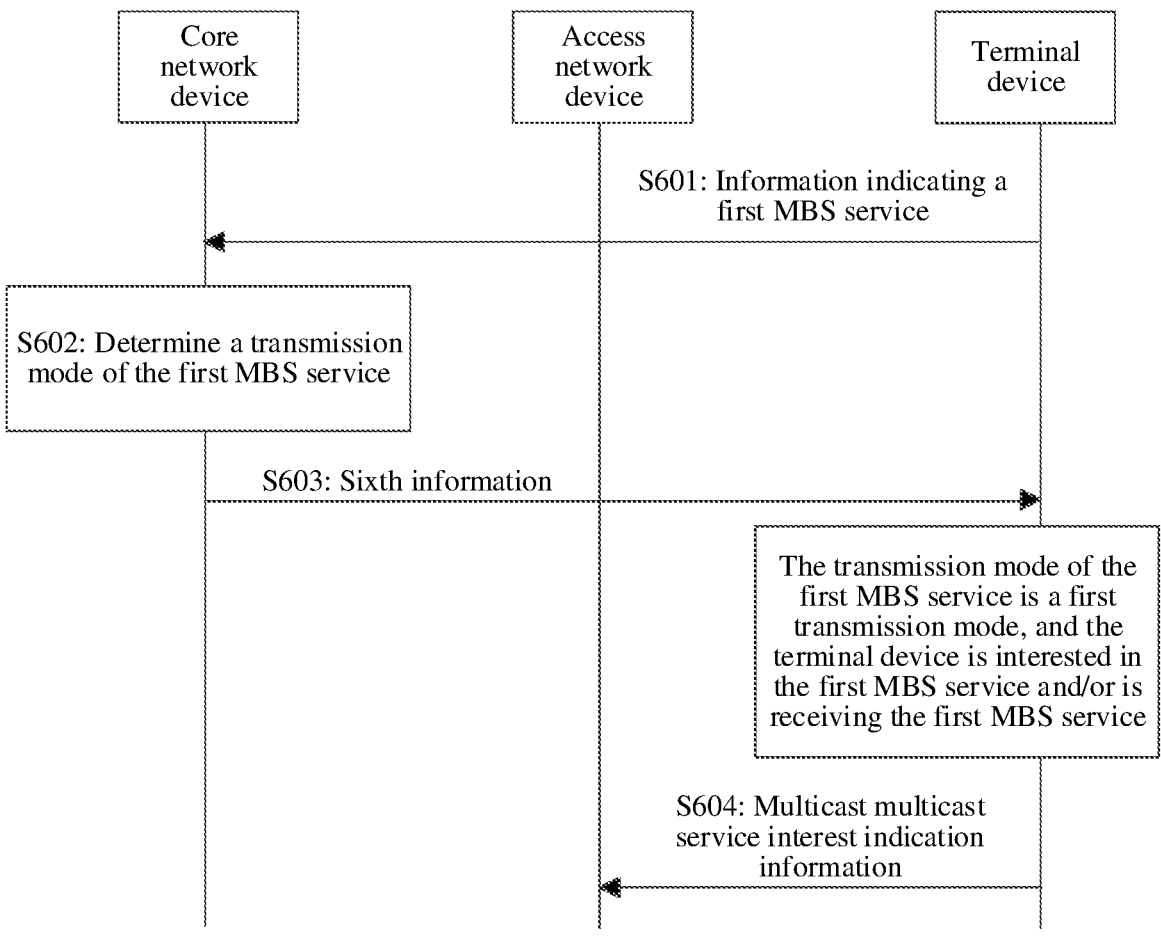
FIG. 16 is a schematic flowchart of another communication method according to at least one embodiment.

In response to the core network device determining the transmission mode of the first MBS service, and the core network device indicates the transmission mode of the first MBS service to the terminal device, the communication method provided in at least one embodiment includes the following steps shown in FIG. 16.

S601: Optionally, a core network device receives information indicating a first MBS service from a terminal device.

The first MBS service is an indicated MBS service that the terminal device is interested in, expects to be receive, and/or is receiving.

The information indicating the first MBS service is sent by the terminal device to the core network device in a process in which the terminal device registers with a core network. Therefore, the core network is informed of, in the registration process, information about the terminal device that is interested in the first MBS service. The information indicating the first MBS service alternatively is from an access network device, another core network device, or another node in a network. For example, the access network device, the another core network device, or the another node in the network forwards the information about the first MBS service from the terminal device to the core network device.

The information indicating the first MBS service includes information such as an identifier of the first MBS service, a radio network temporary identifier used to schedule the first MBS service, an MBS session identifier used to transmit the first MBS service, or a PDU session identifier used to transmit the first MBS service.

S602: The core network device determines a transmission mode of the first MBS service.

The core network device determines that the transmission mode of the first MBS service is a first transmission mode or a second transmission mode. For a manner in which the core network device determines that the transmission mode of the first MBS is the first transmission mode or the second transmission mode, refer to the foregoing description in at least one embodiment, for example, refer to the description of the step shown in S401.

S603: The core network device sends sixth information to the terminal device, where the sixth information indicates that the transmission mode of the first MBS service is a first transmission mode or a second transmission mode.

Optionally, the sixth information specifically indicates that the transmission mode of the first MBS service of the terminal device is the first transmission mode or the second transmission mode. Optionally, the sixth information specifically indicates that one MBS service or at least one of a plurality of MBS services reported by the terminal device during registration is in the first transmission mode or the second transmission mode.

S604: The terminal device sends MBS service interest indication information to an access network device in response to the transmission mode of the first MBS service being the first transmission mode, and the terminal device is interested in the first MBS service and/or is receiving the first MBS service, where the MBS service interest indication information indicates that the transmission mode of the first MBS service is the first transmission mode. For a setting manner and/or a sending manner of the MBS service interest indication information, refer to the description of S103.

For example, the MBS service interest indication information indicates that the terminal device is interested in the first MBS service and/or indicate that the terminal device is receiving data of the first MBS service, or indicate that the terminal device is not interested in the first MBS service and/or indicate that the terminal device is not receiving data of the first MBS service.

Optionally, in response to the transmission mode of the first MBS service being the first transmission mode, the terminal device sends the MBS service interest indication information in response to the following condition being met: A connection between the terminal device and the access network device is successfully established, a session of an MBS service of interest is started or stopped, an MBS service of interest is changed, a priority of receiving an MBS service and a unicast service is changed, a new cell is camped on/switched to/selected, an MBS service of interest reporting request or an MBS interest reporting request is received from the access network device, or the like. Alternatively, the terminal device periodically reports the MBS service interest indication information. The MBS service herein includes, but not limited to, the first MBS service.

Correspondingly, the access network device receives the MBS service interest indication information.

By using the foregoing method, the terminal device reports the broadcast multicast service interest indication information of the first MBS service to the access network device, where the transmission mode of the first MBS service is the first transmission mode. Therefore, the terminal device no longer reports information indicating whether the terminal device is interested in another MBS service and information indicating whether the terminal device is receiving another MBS service, thereby reducing uplink overheads.

In addition, the terminal device further obtains indication information of the transmission mode of the first MBS service from the server. For example, the terminal device obtains the indication information of the transmission mode of the first MBS service from the server in response to communicating with the server. Optionally, the terminal device obtains the indication information by performing communication between an application layer (application layer) of the terminal device and a server. The server herein is, for example, an application server (application server, AS).

Figure 17:
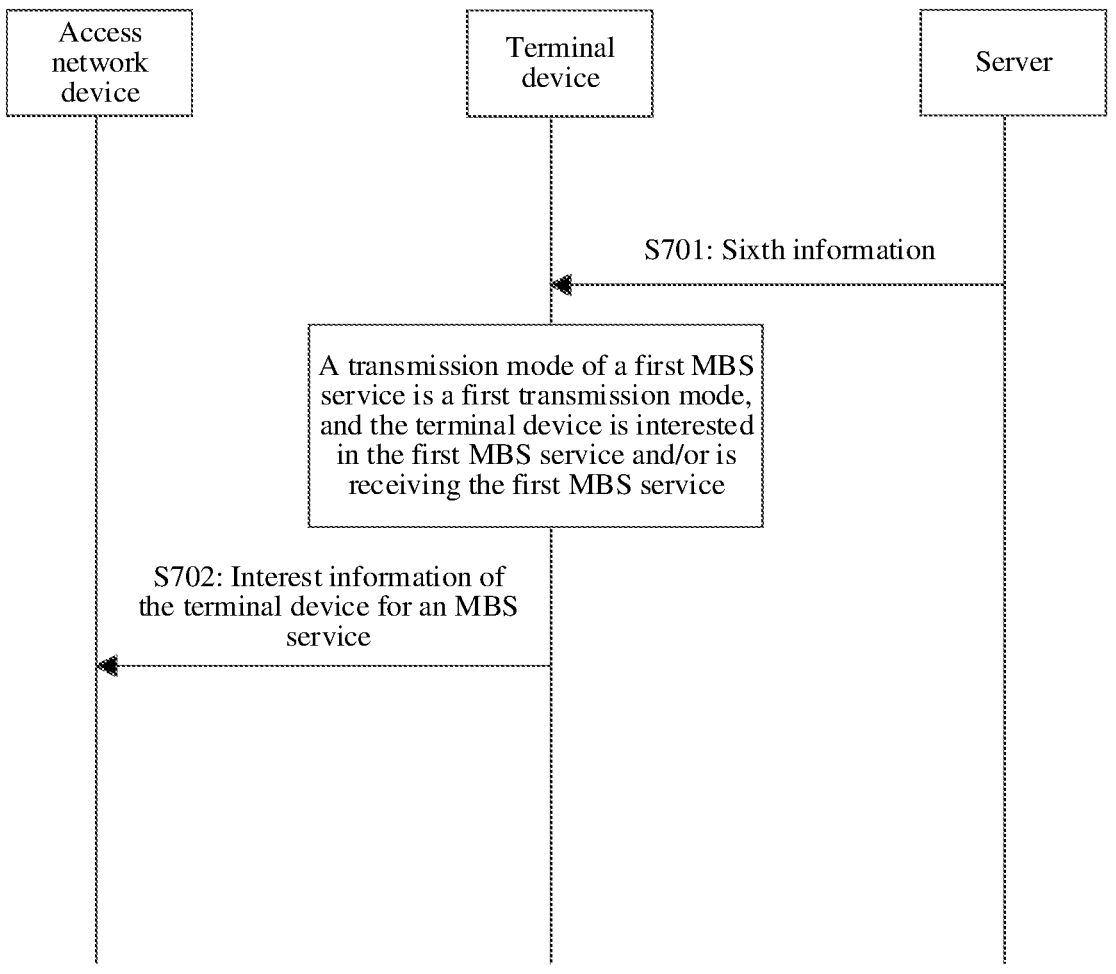
FIG. 17 is a schematic flowchart of another communication method according to at least one embodiment.

As shown in FIG. 17, in response to the terminal device obtaining the indication information of the transmission mode of the first MBS service from the server, another communication method provided in at least one embodiment includes the following steps.

S701: A terminal device obtains sixth information from a server. The sixth information indicates whether a transmission mode of a first MBS service is a first transmission mode or a second transmission mode. The first MBS service is an MBS service that the terminal device is interested in. Optionally, before S701, the terminal device indicates the first MBS service to the server.

For example, the terminal device sends, to the server, information indicating that the terminal device is interested in the first MBS service, where the information is, for example, an identifier or an information element, or send, to the server, for requesting a transmission mode of the first MBS service that the terminal device is interested in, or include information about the first MBS service in a message sent to the server for requesting to register with the server, or send information for requesting to join a multicast group of the first MBS service to the server.

Optionally, the server queries a corresponding transmission mode based on an identifier of an MBS service that the terminal device is interested in, to determine the transmission mode of the MBS service that the terminal device is interested in. For example, the server queries a user service description (user service description, USD) based on an identifier of an MBS service that the terminal device is interested in, to determine a transmission mode of the MBS service.

The foregoing process in which the terminal device indicates the first MBS service to the server and/or the process in which the terminal device obtains the sixth information is implemented by the application layer of the terminal device.

S702: The terminal device sends MBS service interest indication information to an access network device in response to a transmission mode of a first MBS service being a first transmission mode, and the terminal device is interested in the first MBS service and/or is receiving the first MBS service.

The MBS service interest indication information indicates that the terminal device is interested in the first MBS service and/or the terminal device is receiving the first MBS service. For a setting manner and/or a sending manner of the MBS service interest indication information, refer to the description, for example, refer to the description of the step shown in S103. A difference between S702 and S103 lies in that herein, the terminal device actively performs reporting to the access network device, instead of perform reporting based on the first information from the access network device, as in S103.

Correspondingly, the access network device receives the MBS service interest indication information.

By using the foregoing method, the terminal device reports the MBS service interest indication information of the first MBS service to the access network device. Therefore, the terminal device no longer reports information indicating whether the terminal device is interested in another MBS service and information indicating whether the terminal device is receiving another MBS service, thereby reducing uplink overheads.

At least one embodiment provides a communication apparatus. The communication apparatus is configured to implement the terminal device in the foregoing embodiments, and the communication apparatus includes the structure shown in FIG. 5 and/or FIG. 6.

At least one embodiment provides a communication apparatus. The communication apparatus is configured to implement the core network device, the OAM, the operator, the content service provider, or the server in the foregoing embodiments, and the communication apparatus includes the structure shown in FIG. 7 and/or FIG. 8.

At least one embodiment provides a communication apparatus. The communication apparatus is configured to implement the access network device in the foregoing embodiments, and the communication apparatus includes the structure shown in FIG. 9 and/or FIG. 10.

At least one embodiment provides a communication system. The communication system includes at least two of the terminal device, the core network device, the access network device, the OAM, the operator, the content service provider, or the server in the foregoing embodiments. Optionally, the communication system performs the communication method shown in any one of FIG. 10 to FIG. 17 in the foregoing method embodiments.

At least one embodiment further provides a computer-readable storage medium. The computer-readable storage medium stores a computer program. In response to the computer program being executed by a computer, the computer implements a process related to the terminal device, the core network device, the access network device, the OAM, the operator, the content service provider, or the server in any one of the foregoing method embodiments.

At least one embodiment further provides a computer program product. The computer program product is configured to store a computer program. In response to the computer program being executed by a computer, the computer implements a process related to the terminal device, the core network device, the access network device, the OAM, the operator, the content service provider, or the server in any one of the foregoing method embodiments.

At least one embodiment further provides a chip or a chip system. The chip includes a processor. The processor is configured to invoke a program or instructions in a memory, and perform a process related to the terminal device, the core network device, the access network device, the OAM, the operator, the content service provider, or the server in any one of the foregoing method embodiments. The chip system includes the chip, and further includes another component such as a memory or a transceiver.

At least one embodiment further provides a circuit. The circuit is coupled to a memory, and is configured to perform a process related to the terminal device, the core network device, the access network device, the OAM, the operator, the content service provider, or the server in any one of the foregoing method embodiments. The chip system includes the chip, and further includes another component such as a memory or a transceiver.

The processor mentioned in at least one embodiment is a CPU or is another general purpose processor, a digital signal processor (digital signal processor, DSP), an application specific integrated circuit (application specific integrated circuit, ASIC), a field programmable gate array (field programmable gate array, FPGA) or another programmable logical device, a discrete gate or transistor logic device, a discrete hardware component, or the like. A general purpose processor is a microprocessor, or the processor is also any conventional processor, or the like.

The memory in at least one embodiment is a volatile memory or a non-volatile memory, or includes a volatile memory and a non-volatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), and is used as an external cache. Through example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

In response to the processor being a general purpose processor, a DSP, an ASIC, an FPGA, or another programmable logic device, a discrete gate or a transistor logic device, or a discrete hardware component, the memory (a storage module) is integrated into the processor.

The memory described in at least one embodiment intends to include, but not limited to, these memories and any other memory of an appropriate type.

In at least one embodiment, sequence numbers of the foregoing processes do not indicate an execution sequence. The execution sequence of the processes should be determined according to functions and internal logic of the processes, and should not be construed as any limitation on the implementation processes of at least one embodiment.

A person of ordinary skill in the art is aware that, in combination with the examples described in the embodiments described herein, modules and algorithm steps is implemented by electronic hardware or a combination of computer software and electronic hardware. Whether the functions are executed in a manner of hardware or software depends on particular applications and design constraint conditions of the technical solutions. A person skilled in the art is able to use different methods to implement the described functions for each particular application, but the implementation does not goes beyond the scope of embodiments described herein.

A person skilled in the art that, for the purpose of convenient and brief description, for a detailed working process of the foregoing system, apparatus, and module, reference is made to a corresponding process in the foregoing method embodiments, and details are not described herein again.

In embodiments described herein, should be understood that the disclosed communication method and apparatus is implemented in other manners. For example, the described apparatus embodiment is merely exemplary. For example, the module division is merely logical function division and is other division in actual implementation. For example, a plurality of modules or components is combined or integrated into another system, or some features is ignored or not performed. In addition, the shown or discussed mutual couplings or direct couplings or communication connections is implemented through some interfaces. The indirect couplings or communication connections between the apparatus or units is implemented in electronic, mechanical, or other forms.

The modules described as separate parts may or may not be physically separate, and parts displayed as modules may or may not be physical modules, is located in one position, or is distributed on a plurality of network units. Some or all of the units is selected according to actual use to achieve the objectives of the solutions of embodiments.

In addition, functional modules in at least one embodiment is integrated into one processing module, or each of the modules exist alone physically, or two or more modules is integrated into one module.

In response to the functions being implemented in the form of a software functional module and sold or used as an independent product, the functions is stored in a computer-readable storage medium. Based on such an understanding, the technical solutions of embodiments described herein essentially, or the part making a contribution, or some of the technical solutions is implemented in a form of a software product. The computer software product is stored in a storage medium, and includes several instructions for instructing a computer device, which is a personal computer, a server, a network device, or the like, to perform all or some of the steps of the methods described in at least one embodiment. The foregoing computer-readable storage medium is any available medium accessible to a computer. The following provides an example but does not impose a limitation: The computer-readable medium includes a random access memory (random access memory, RAM), a read-only memory (read-only memory, ROM), an electrically erasable programmable read-only memory (electrically erasable programmable read-only memory, EEPROM), a compact disc read-only memory (compact disc read-only memory, CD-ROM), a universal serial bus flash disk (universal serial bus flash disk), a removable hard disk, or another optical disc storage or a disk storage medium, or another magnetic storage device, or any other medium that carriers or stores expected program code in a form of an instruction or a data structure and is accessed by a computer.

The foregoing descriptions are merely specific implementations, but are not intended to limit the protection scope of embodiments described herein. Any variation or replacement readily figured out by a person skilled in the art within the technical scope disclosed in at least one embodiment shall fall within the protection scope of embodiments described herein. Therefore, the protection scope of embodiments described herein are subject to the protection scope of the claims.

The invention claimed is:

1. A communication method, comprising:

determining that a transmission mode of a first broadcast multicast service is a first transmission mode or a second transmission mode, wherein the first transmission mode is a transmission mode in which a broadcast multicast service is received in any one of a connected state, an inactive state, or an idle state, the second transmission mode is a transmission mode in which a broadcast multicast service is received in a connected state and is not received in an inactive state or an idle state; or the second transmission mode is a transmission mode for broadcast multicast service available in connected state; and sending first information of the transmission mode of the first broadcast multicast service, wherein the first information comprises an indication of the transmission mode of the first broadcast multicast service and a quality of service, QoS-related configuration file of the first broadcast multicast service, and the QoS-related configuration file comprises a 5G quality identity, 5QI, of the first broadcast multicast service.

2. The method according to claim 1, wherein the method further comprising: sending information indicating that terminal device is allowed to return to or enter the idle state or the inactive state after registration.

3. The method according to claim 1, wherein the first information is configured by an Operation And Maintenance (OAM) system, an operator, a content service provider, or a core network device.

4. A communication method, comprising:

receiving first information from a core network device; wherein the first information indicates a transmission mode of a first broadcast multicast service, wherein the transmission mode of the first broadcast multicast service is a first transmission mode or a second transmission mode, wherein the first transmission mode is a transmission mode in which a broadcast multicast service is received in any one of a connected state, an inactive state, or an idle state, the second transmission mode is a transmission mode in which a broadcast multicast service is received in a connected state and is not received in an inactive state or an idle state; or the second transmission mode is a transmission mode for broadcast multicast service available in a connected state;

determining, the transmission mode of the first broadcast multicast service based on the first information, wherein the first information comprises an indication of the transmission mode of the first broadcast multicast service and a quality of service, QoS-related configuration file of the first broadcast multicast service, and the QoS-related configuration file comprises a 5G quality identity, 5QI, of the first broadcast multicast service.

5. The method according to claim 4, wherein the receiving the first information includes receiving information indicating that a terminal device is allowed to return to or enter the idle state or the inactive state after registration.

6. The method according to claim 4, wherein the receiving the first information includes receiving the first information configured by an Operation And Maintenance (OAM) system, an operator, a content service provider, or the core network device.

7. An apparatus, comprising:

a non-transitory memory storage comprising instructions; and one or more processors in communication with the memory storage, wherein the instructions, when executed by the one or more processors, cause the apparatus to:

determine that a transmission mode of a first broadcast multicast service is a first transmission mode or a second transmission mode, wherein the first transmission mode is a transmission mode in which a broadcast multicast service is received in any one of a connected state, an inactive state, or an idle state, the second transmission mode is a transmission mode in which a broadcast multicast service is received in a connected state and is not received in an inactive state or an idle state; or the second transmission mode is a transmission mode for broadcast multicast service available in connected state; and send first information of the transmission mode of the first broadcast multicast service, wherein the first information comprises an indication of the transmission mode of the first broadcast multicast service and a quality of service, QoS-related configuration file of the first broadcast multicast service, and the QoS-related configuration file comprises a 5G quality identity, 5QI, of the first broadcast multicast service.

8. The apparatus according to claim 7, wherein the first information includes information indicating that terminal device is allowed to return to or enter the idle state or the inactive state after registration.

9. The apparatus according to claim 7, wherein the first information is configured by an Operation And Maintenance (OAM) system, an operator, a content service provider, or a core network device.

10. An apparatus, comprising:

a non-transitory memory storage comprising instructions; and one or more processors in communication with the memory storage, wherein the instructions, when executed by the one or more processors, cause the apparatus to:

receiving first information from a core network device; wherein the first information indicates a transmission mode of a first broadcast multicast service, wherein the transmission mode of the first broadcast multicast service is a first transmission mode or a second transmission mode, wherein the first transmission mode is a transmission mode in which a broadcast multicast service is received in any one of a connected state, an inactive state, or an idle state, the second transmission mode is a transmission mode in which a broadcast multicast service is received in a connected state and is not received in an inactive state or an idle state; or the second transmission mode is a transmission mode for broadcast multicast service available in connected state;

determining, the transmission mode of the first broadcast multicast service based on the first information, wherein the first information comprises an indication of the transmission mode of the first broadcast multicast service and a quality of service, QoS-related configuration file of the first broadcast multicast service, and the QoS-related configuration file comprises a 5G quality identity, 5QI, of the first broadcast multicast service.

11. The apparatus according to claim 10, wherein the first information includes information indicating that terminal device is allowed to return to or enter the idle state or the inactive state after registration.

12. The apparatus according to claim 10, wherein the first information is configured by an Operation And Maintenance (OAM) system, an operator, a content service provider, or the core network device.

\*   \*   \*   \*   \*